United States Patent
Ji et al.

(10) Patent No.: US 11,026,144 B2
(45) Date of Patent: *Jun. 1, 2021

(54) NON-CELLULAR LINK INTEGRATION WITH CELLULAR NETWORKS

(71) Applicant: AT&T Intellectual Property I, L.P., Atlanta, GA (US)

(72) Inventors: Lusheng Ji, Randolph, NJ (US); Robert Raymond Miller, II, Convent Stn, NJ (US); Bo Han, Summit, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/431,726

(22) Filed: Jun. 4, 2019

(65) Prior Publication Data

US 2019/0289518 A1    Sep. 19, 2019

Related U.S. Application Data

(63) Continuation of application No. 15/368,783, filed on Dec. 5, 2016, now Pat. No. 10,334,495, which is a (Continued)

(51) Int. Cl.
*H04W 76/00*        (2018.01)
*H04W 36/14*        (2009.01)
(Continued)

(52) U.S. Cl.
CPC ......... *H04W 36/14* (2013.01); *H04J 11/0023* (2013.01); *H04W 28/08* (2013.01);
(Continued)

(58) Field of Classification Search
CPC .................................................. H04W 36/14
See application file for complete search history.

(56) References Cited

U.S. PATENT DOCUMENTS 7,643,455 B2    1/2010    Linder et al.
7,948,990 B2    5/2011    Hurtta et al.
(Continued)

FOREIGN PATENT DOCUMENTS

| EP | 2 601 770 A1 | 6/2013 |
| WO | 2013/025132 A1 | 2/2013 |
| WO | 2013/083189 A1 | 6/2013 |

OTHER PUBLICATIONS

Dababneh, "LTE Traffic Generation and Evolved Packet Core (EPC) Network Planning". Ottawa-Carleton Institute for Electrical and Computer Engineering (OCIECE), Department of Systems and Computer Engineering, Carleton University, Mar. 2013; (c)Copyright 2013,Dima Dababneh. Retrieved on Jul. 10, 2013,112 pages.

(Continued)

*Primary Examiner* — John D Blanton
(74) *Attorney, Agent, or Firm* — Amin, Turocy & Watson, LLP

(57) ABSTRACT

Improved non-cellular (e.g., Wi-Fi) link integration with a cellular (e.g., LTE) network is described. The improved link integration can relate to utilizing an eNodeB device (e.g., residing in a radio access network portion of a cellular network) as an anchor point rather than a packet data network gateway device (e.g., residing in a core network portion of the cellular network) utilized by other approaches. The improved link integration can maintain full compliance with or support for other approaches, and can reduce signaling overhead, simplify quality-of-service management, and/or provide a more rapid reaction to changes of access, particularly in cases where the eNodeB device and a non-cellular access point device are co-located.

20 Claims, 14 Drawing Sheets

Related U.S. Application Data continuation of application No. 15/005,585, filed on Jan. 25, 2016, now Pat. No. 9,544,843, which is a continuation of application No. 14/042,064, filed on Sep. 30, 2013, now Pat. No. 9,277,580.

(51) Int. Cl.

| | | |
|---|---|---|
| *H04W 76/16* | (2018.01) | |
| *H04W 76/12* | (2018.01) | |
| *H04W 28/08* | (2009.01) | |
| *H04J 11/00* | (2006.01) | |
| *H04W 48/18* | (2009.01) | |
| *H04W 72/04* | (2009.01) | |
| *H04W 84/12* | (2009.01) | |
| *H04W 88/06* | (2009.01) | |

(52) U.S. Cl.
CPC ......... *H04W 48/18* (2013.01); *H04W 72/042* (2013.01); *H04W 72/0406* (2013.01); *H04W 76/12* (2018.02); *H04W 76/16* (2018.02); *H04W 84/12* (2013.01); *H04W 88/06* (2013.01)

(56) References Cited

U.S. PATENT DOCUMENTS

| | | | |
|---|---|---|---|
| 8,027,309 B2 | 9/2011 | Kotecha et al. | |
| 8,289,920 B2 | 10/2012 | Wang et al. | |
| 8,432,872 B2 | 4/2013 | Swaminathan | |
| 8,457,635 B2 | 6/2013 | Bachmann et al. | |
| 9,277,580 B2 * | 3/2016 | Ji | H04J 11/0023 |
| 9,544,843 B2 * | 1/2017 | Ji | H04W 76/16 |
| 10,334,495 B2 * | 6/2019 | Ji | H04W 36/14 |
| 2006/0099949 A1 | 5/2006 | Jung et al. | |
| 2009/0303966 A1 | 12/2009 | Cherian et al. | |
| 2010/0185719 A1 | 7/2010 | Howard | |
| 2011/0134882 A1 | 6/2011 | Aoyama et al. | |
| 2011/0200010 A1 | 8/2011 | Hu et al. | |
| 2011/0242975 A1 * | 10/2011 | Zhao | H04L 29/12216 370/230 |
| 2012/0044836 A1 | 2/2012 | Sivavakeesar et al. | |
| 2012/0224566 A1 | 9/2012 | O'Leary | |
| 2012/0287790 A1 * | 11/2012 | Huang | H04W 28/10 370/236 |
| 2013/0017837 A1 | 1/2013 | Hakola et al. | |
| 2013/0170435 A1 | 7/2013 | Dinan | |
| 2013/0242965 A1 | 9/2013 | Horn et al. | |
| 2013/0273857 A1 | 10/2013 | Zhang et al. | |
| 2014/0003328 A1 | 1/2014 | Mildh et al. | |
| 2014/0071925 A1 * | 3/2014 | Liu | H04W 28/08 370/329 |
| 2014/0082697 A1 * | 3/2014 | Watfa | H04W 76/15 726/3 |
| 2014/0092828 A1 | 4/2014 | Sirotkin | |
| 2014/0119353 A1 | 5/2014 | McCann et al. | |
| 2014/0133294 A1 | 5/2014 | Horn et al. | |
| 2014/0376515 A1 | 12/2014 | Lei et al. | |
| 2015/0043486 A1 | 2/2015 | Ozturk | |
| 2015/0071059 A1 | 3/2015 | Fu et al. | |
| 2016/0192266 A1 | 6/2016 | Dai et al. | |

OTHER PUBLICATIONS

Ekstrom, "QoS control in the 3GPP evolved packet system," LTE—3GPP Release 8, Communications Magazine, IEEE, 2009, vol. 47, No. 2, pp. 76, 83. Retrieved on Jul. 10, 2013, 8 pages.

Kappler, et al., "Dynamic network composition for beyond 3G networks: a 3GPP viewpoint," Network, IEEE, 2007, vol. 21, No. 1, pp. 47, 52. Retrieved on Jul. 10, 2013, 6 pages.

Punz, "Architecture of the Evolved 3GPP System." Evolution of 3G Networks: The Concept, Architecture and Realization of Mobile Networks Beyond UMTS, 2010, pp. 33-72, http://link.springer.com/chapter10.1007/978-3-211-09440-2_3. Retrieved on Jul. 10, 2013, 43 pages.

Non-Final Office Action received for U.S. Appl. No. 14/042,064 dated May 18, 2015, 16 pages.

Non-Final Office Action received for U.S. Appl. No. 15/005,585 dated Mar. 11, 2016, 23 pages.

Non-Final Office Action received for U.S. Appl. No. 15/368,783 dated Feb. 13, 2017, 24 pages.

Final Office Action received for U.S. Appl. No. 15/368,783 dated Jul. 21, 2017, 29 pages.

Non-Final Office Action received for U.S. Appl. No. 15/368,783 dated Sep. 11, 2018, 26 pages.

Final Office Action received for U.S. Appl. No. 15/368,783 dated Mar. 14, 2018, 25 pages.

* cited by examiner

NON-CELLULAR LINK INTEGRATION WITH CELLULAR NETWORKS

CROSS-REFERENCE TO RELATED APPLICATIONS

This application is a continuation of, and claims priority to each of, U.S. patent application Ser. No. 15/368,783 (now U.S. Pat. No. 10,334,495), filed on Dec. 5, 2016, entitled "NON-CELLULAR LINK INTEGRATION WITH CELLULAR NETWORKS", which is a continuation of U.S. patent application Ser. No. 15/005,585 (now U.S. Pat. No. 9,544,843), filed on Jan. 25, 2016, entitled "NON-CELLULAR LINK INTEGRATION WITH CELLULAR NETWORKS", which is a continuation of U.S. patent application Ser. No. 14/042,064 (now U.S. Pat. No. 9,277,580), filed on Sep. 30, 2013, entitled "NON-CELLULAR LINK INTEGRATION WITH CELLULAR NETWORKS." The entireties of the above noted applications are incorporated herein by reference.

TECHNICAL FIELD

The present application relates generally to integrating non-cellular communication with a cellular communication network.

BACKGROUND

Third generation partnership project (3GPP) standards define how non-3GPP access can be integrated into the long term evolution (LTE) cellular infrastructure in specification TS 23.402 and several additional documents. A number of architectural designs are specified for different application situations such as roaming vs. non-roaming, local breakout vs. home-routed, etc. However, such documents share the same fundamental approach. In this regard, a mobile device or other user equipment (UE) attached to a non-3GPP access network forms a "tunnel" to a packet data network gateway (PGW) in the evolved packet core of the LTE cellular infrastructure over the non-3GPP link and the associated access network, and uses the tunnel at the PGW as an integration anchor point.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
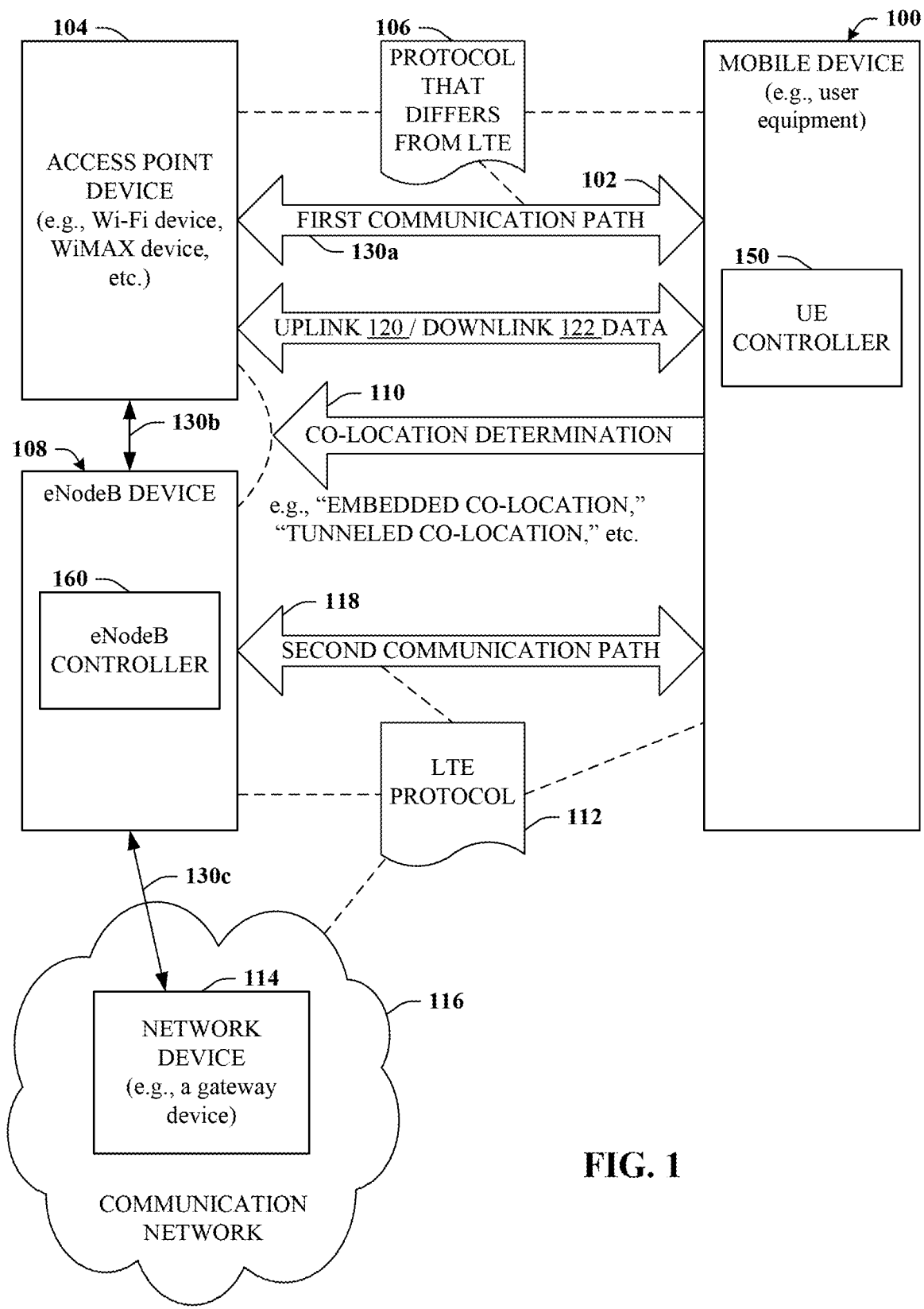
FIG. 1 illustrates a block diagram of an example mobile device and an example eNodeB device that can provide for non-cellular link integration with cellular networks in accordance with certain embodiments of this disclosure.

In response to increased demand for capacity, communication network carriers are reducing cell sizes as well as incorporating other wireless communication technologies, such as wireless fidelity (Wi-Fi), into their service infrastructure. One result of reducing cell sizes and incorporating other wireless communication technologies is that the relationship between Wi-Fi (or other technologies) installations and cellular infrastructure is becoming closer than ever.

Historically, Wi-Fi and many other non-3GPP communication technologies had a "grassroots" upbringing where access was typically provided by individual establishments. Over time, business aggregators began to appear that offered users access to large numbers of individually owned and managed Wi-Fi hotspots using a single accounting and authentication platform. Some market actors even began systematic deployments of Wi-Fi hotspots at strategic locations such as airports, hotels, and chain restaurants.

Concurrently, cellular (e.g., 3GPP) providers also began to add Wi-Fi hotspot service to their access product offer list, complementary to traditional cellular services, either by owning their own Wi-Fi operations or forming a business alliance with a hotspot service provider. Accordingly, Wi-Fi and other non-3GPP access networks were historically operated as separate networks with no direct connection to 3GPP (or other) cellular networks other than the fact all might interface to the global Internet.

Recently, there has been a push to technologically integrate non-cellular access platforms into cellular access platforms. For example, with advances in cellular standards and technologies, cellular (e.g., LTE) providers are incorporating non-cellular (e.g., Wi-Fi) service into associated service infrastructure in a more integrated manner. For instance, different than before, cellular networks might use both LTE and Wi-Fi access links flexibly. In addition, the transition of data traffic from one access network to another, as well as splitting and merging of data traffic over these access networks links might be accomplished seamlessly. Thus, user traffic can be transparently carried by either or both LTE and Wi-Fi accesses, without affecting upper layer applications and services.

For example, 3GPP standards define how non-3GPP access can be integrated into LTE cellular infrastructure in specification TS 23.402, which is incorporated herein by reference. A number of architectural designs are specified for different application situations such as roaming vs. non-roaming, local breakout vs. home-routed, etc. However, all such documents share the same fundamental approach. Essentially, a mobile device or other UE attached to a non-3GPP access network is required to form a "tunnel" to a packet data network gateway (PGW) in the evolved packet core of the LTE cellular infrastructure over the non-3GPP link and the associated access network. Outgoing IP traffic from the UE is tunneled from the UE via the non-3GPP access to the PGW then forwarded to the external IP network, e.g. the Internet. Incoming IP traffic that arrives at the PGW can be forwarded to the UE via this tunnel. Accordingly, the PGW operates as the traffic anchor point for the UE both for supporting mobility and change of access technologies.

While the above approach maintains a unified solution for incorporating different kinds of non-3GPP access technologies, including Wi-Fi, WiMAX, and other types of wireless IP access technologies, the design of using the PGW as an anchor point also implies that to the 3GPP cellular network, these non-3GPP accesses are both external in the sense that backhauls to these accesses are not owned and controlled by the cellular operators, and remote in terms of network topology.

Moreover, as noted previously, there is a movement in the industry toward smaller cells as opposed to large wireless towers. For example, small cell base station hardware is often capable of also providing Wi-Fi access. Moreover, small cell base stations are often themselves becoming "external" because such cells can be deployed on external networks such as customer enterprise Ethernets, which are both not under cellular operator control and often shared with customer Wi-Fi access points covering the same physical areas.

Based on these observations, the solution to integrating non-cellular communication with cellular communication as proposed by TS 23.402 and other related documents can be improved. For example, the disclosed subject matter can leverage the fact that in many cases an evolved nodeB (eNodeB) of an LTE cellular network can be co-located with a non-cellular (e.g., Wi-Fi) access point device. Due to such co-location, it is no longer necessary or advantageous to use the PGW as an anchor point or forming tunnels between the UE and the PGW, as is detailed by TS 23.402. Rather, some embodiments of the disclosed subject matter can establish tunnels over non-3GPP accesses between the UE and the eNodeB serving that UE. Such can allow for tightly coupled 3GPP and non-3GPP access installations. Such an approach can provide for numerous advantages such as, e.g., reduced signaling overhead, simplified quality-of-service management, and a more rapid reaction to changes of access. Such advantages can arise due to the fact that tunnels can be managed locally between the UE and the serving eNodeB, rather than being managed in the core network by a gateway such as the PGW.

In some embodiments, the disclosed subject matter can provide an enhancement to the current 3GPP architecture for incorporating non-3GPP accesses. The disclosed subject matter can be fully compatible and complementary to the above mentioned 3GPP designs for incorporating non-3GPP accesses. In particular, embodiments of the disclosed subject matter provide for seamless integration of different non-3GPP access technologies onto a 3GPP cellular platform for situations where the non-3GPP accesses are provided in a manner that are networked topologically closer to 3GPP access than what the 3GPP designs for currently. Embodiments of the disclosed subject matter can take advantage of such "closeness" and can offer a more efficient way of supporting tight integration of non-3GPP accesses to 3GPP infrastructure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Long term evolution (LTE) is a standard for cellular-based wireless communication maintained by the third generation partnership project (3GPP). Although the subject matter disclosed herein relates to such standards, it is appreciated that the terms "LTE" and "3GPP," as used herein, can relate to substantially any cellular-based wireless communication network. That is, in some embodiments, the terms "LTE," "3GPP," and "cellular" can be used interchangeably. The terms "non-LTE," "non-3GPP," and "non-cellular" can also be used interchangeably herein and are intended to denote communication standards, protocols, or technologies, typically wireless (e.g., wireless fidelity (Wi-Fi), worldwide interoperability for microwave access (WiMAX), high rate packet data (HRPD), etc.), which differ from cellular-based standards, protocols, or technologies such as 3GPP or LTE.

Referring now to the drawing, with reference initially to FIG. 1, mobile device 100 is depicted. Mobile device 100 can provide for non-cellular link integration with cellular networks. Mobile device 100 can represent any suitable user equipment (UE) that can access data or services of a cellular network provider, and can include a memory to store instructions and, coupled to the memory, a processor that facilitates execution of the instructions to perform operations. Examples of the memory and processor can be found with reference to FIG. 14. It is to be appreciated that the computer 1402 can represent a service device of a communications network or a user equipment device and can be used in connection with implementing one or more of the systems or components shown and described in connection with FIG. 1 and other figures disclosed herein.

In particular, mobile device 100 can be configured to establish first communication path 102 with access point device 104. Access point device 104 can be a wireless-type access point device, e.g., a Wi-Fi device, a WiMax device, a HRPD-based device, or substantially any other access point device that operates according to protocol 106 that is non-cellular in nature. For example, protocol 106 can be a protocol that differs from a cellular protocol such as a 3GPP protocol or LTE protocol 112. First communication path 102 can relate to a communications link established between mobile device 100 and access point device 104.

Mobile device 100 can be configured to determine that access point device 104 is co-located with eNodeB device 108, which can be accomplished by way of co-location determination 110. The eNodeB device 108 can be configured to operate according to LTE protocol 112 in connection with communication with network device 114 of communication network 116. It is understood that communication network 116 can be an LTE network and can include LTE-enabled devices or paths, such as eNodeB device 108, mobile device 100, and second communication path 118. In some embodiments, network device 114 can be a gateway device (e.g., a PGW device) that resides in a core network portion of communication network 116, which can be a cellular-based communication network, such as 3GPP or LTE.

Co-location determination 110 can relate to a data discovery technique or any other suitable technique by which it can be determined that access point device 104 and eNodeB device 108 are co-located. For example, co-location determination 110 can relate to determining that access point device 104 and eNodeB device 108 are physically co-located and/or comprise a common physical structure. The common physically structure will typically be a common housing, casing, or enclosure, but can also relate to a common tower or antenna array. Such embodiments are referred to herein as "embedded co-location," and described in more detail in with reference to FIG. 3.

In some embodiments, co-location determination 110 can relate to determining that access point device 104 and eNodeB device 108 are topologically co-located with respect to a defined network topology. For example, the access point device 104 and the eNodeB device can represent topologically close nodes (or share a common node) on a shared Ethernet or other local area network (LAN). Such embodiments are referred to herein as "tunneled co-location," and described in more detail in connection with reference to FIG. 4. In the case of tunneled co-location, mobile device 100 can further provide for receiving an indication (or otherwise determining) that a secure tunnel has been established between the access point device 104 and the eNodeB device 108 (that are topologically close to one another). The secure tunnel can be a secure communication path between access point device 104 and eNodeB device 108.

Mobile device 100 can be further configured to establish second communication path 118 with eNodeB device 108. Second communication path 118 can be established in connection with LTE protocol 112 (or another suitable cellular-based protocol). It is understood that the terms "first" and "second" are not intended in this case to imply a temporal order. For example, second communication path 118 can exist prior to establishing first communication path 102. Mobile device 100 can be further configured to communicate data 120 and/or 122 between mobile device 100 and network device 114 via path 130 (e.g., 130a-130c) that traverses first communication path 102 and eNodeB device 108. For example, mobile device 100 can transmit outgoing data (e.g., uplink data 120) to network device 114 via path 130 or receive incoming data (e.g., downlink data 122) from network device 114 via path 130.

It is appreciated that such differs from other solutions that form a tunnel between the UE and the PGW. Such tunnels made by other solutions completely by-pass the associated eNodeB and therefore do not leverage the advantages that can be obtained due to the fact that the eNodeB device and the non-cellular access point (e.g., Wi-Fi) device are physically and/or network topologically close.

Various aspects of the disclosed subject matter can be facilitated by controller components or modules. In some embodiments, mobile device 100 can comprise the controller component (e.g., UE controller 150). In some embodiments, eNodeB device 108 can comprise the controller component (e.g., eNodeB controller 160). In some embodiments, mobile device 100 and eNodeB device 108 can each comprise a respective controller 150, 160. These controller components (e.g., UE controller 150 and eNodeB controller 160) can manage or facilitate the operations detailed herein as well as determine how communications are to be transported in a manner that provides additional efficiencies and other advantages while still remaining compliant with other solutions, which is further detailed herein, particularly with respect to FIGS. 6-8B.

Figure 2:
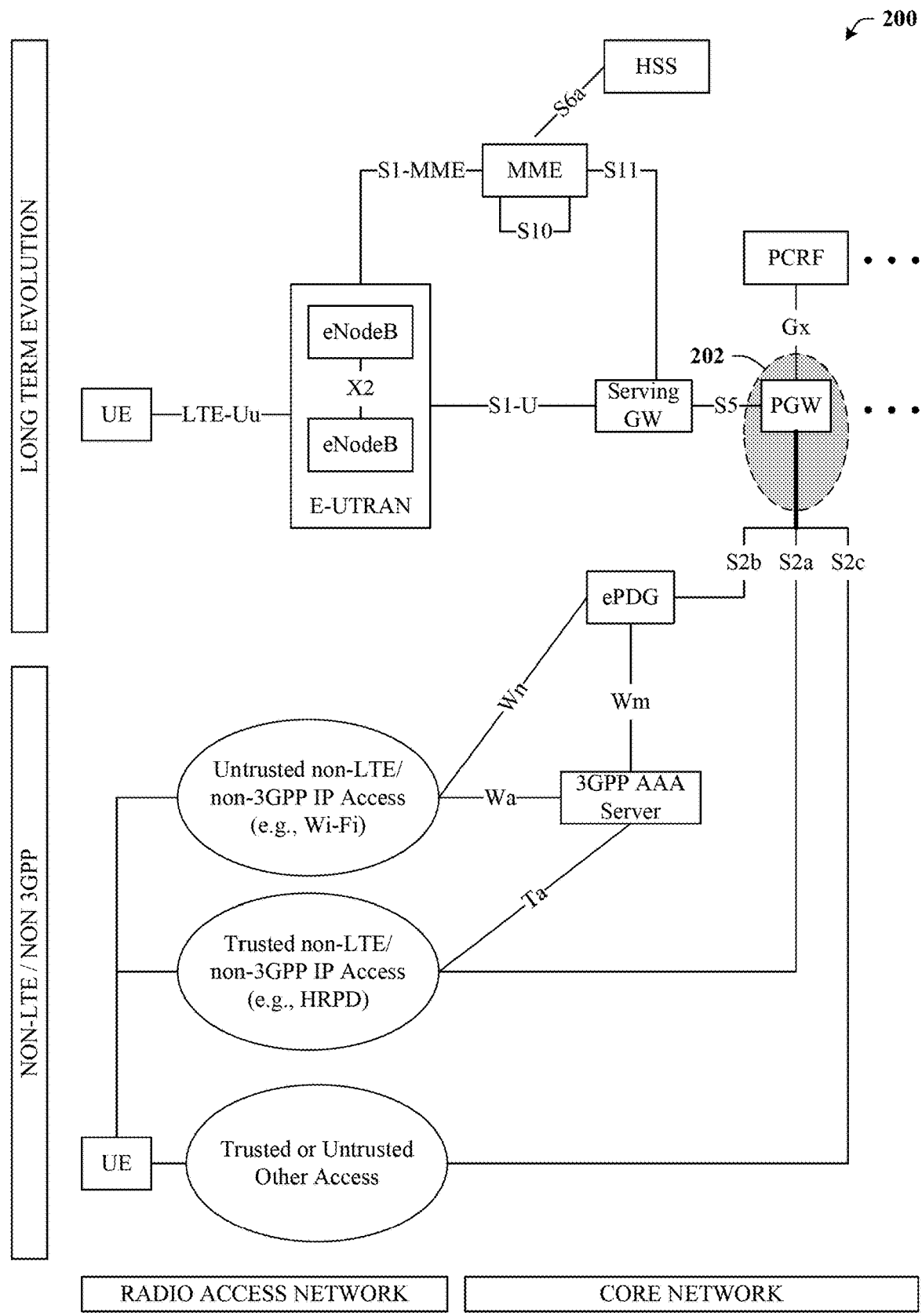
FIG. 2 illustrates a block diagram of an example integrated network in accordance with certain embodiments of this disclosure.

Turning now to FIG. 2, example integrated network 200 is provided. Integrated network 200 is intended to represent a cellular network (e.g., a long term evolution network) that facilitates integration with a non-cellular network. The various network devices associated with the LTE or cellular network are depicted at the upper portion while the various devices associated with the non-LTE network (e.g., Wi-Fi) are depicted at the lower portion. The radio access network (RAN) portion of both networks are depicted on the left portion, while the core network (CN) portions of both networks are depicted on the right portion of FIG. 2. The RAN portion generally provides radio wireless access for mobile units (e.g., UE) via base stations. The RAN portion generally comprises mobile units, base stations, and any additional components for coordinating radio related operations. The CN portion generally comprises various gateways for interfacing with both RAN and external networks (e.g. the Internet), and components or devices for functions such as authentication, admission control, and charging.

As noted previously, other solutions associated with integrating non-cellular links with cellular networks are directed to utilizing the packet data network gateway, or PGW, which exists in the core network, as the anchor point, as illustrated by reference numeral 202. For example, other solutions for non-LTE access to the LTE communication network relies on the operation of forming a tunnel for non-LTE access to the PGW. This PGW serves both as the anchor point for supporting non-LTE access as well as user traffic mobility across LTE and non-LTE accesses.

In contrast to other solutions, embodiments of the disclosed subject matter can provide certain advantages, particularly in connection with deployment scenarios where the non-cellular (e.g., non-LTE or non-3GPP) access (via e.g., a Wi-Fi access point) and the cellular access (via e.g., an eNodeB) are co-located. For example, co-location can occur in cases where the non-cellular access is provided by an interface that is on the platform of the eNodeB, or at a location that is topologically close to the eNodeB, e.g., on the same Ethernet that the eNodeB is connected to. Such non-cellular access can be referred to as "co-located non-cellular access." It is to be understood that co-location is not a requirement of the disclosed subject matter, but such deployment scenarios are believed to optimize the advantages of the disclosed subject matter, while reducing security concerns.

Figure 3:
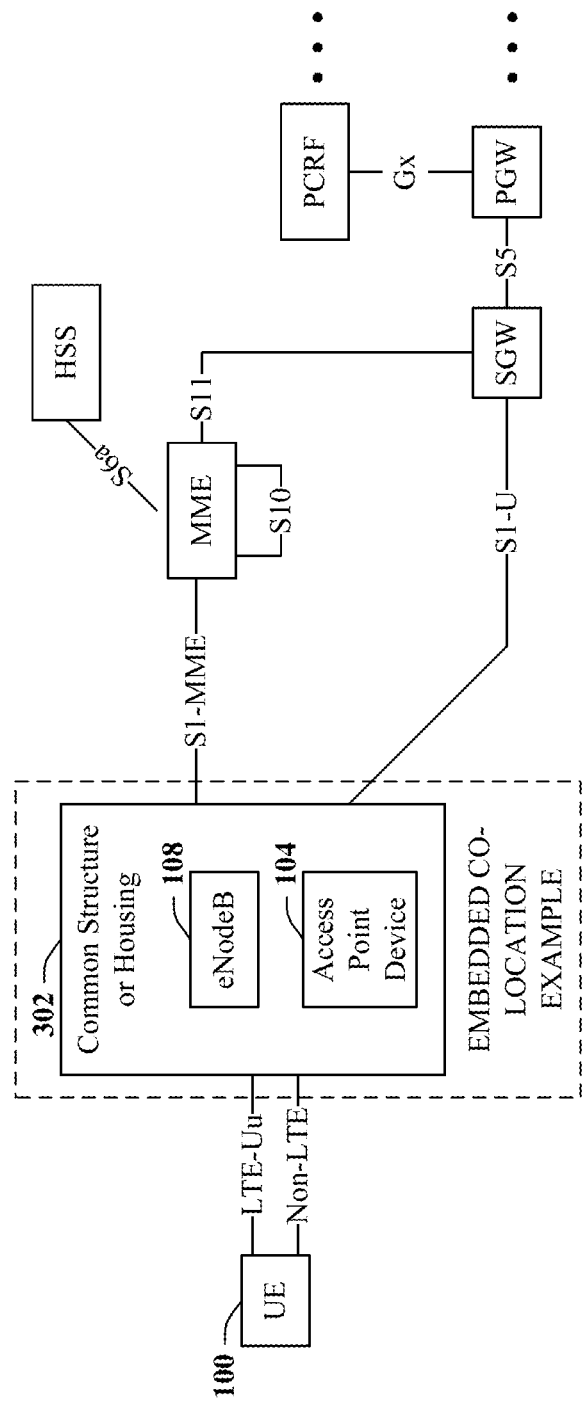
FIG. 3 illustrates a block diagram of an example system according to an embedded co-location embodiment in accordance with certain embodiments of this disclosure.

Referring now to FIG. 3, system 300 is depicted. System 300 relates to an embedded co-location embodiment of the disclosed subject matter. The embedded co-location embodiment can be characterized by eNodeB device 108 and access point device 104 sharing common structure or housing 302. The UE (in this case mobile device 100), can establish multiple links with eNodeB device 108. Such can include one or more LTE protocol-based paths (e.g., LTE-Uu) as well as one or more non-LTE connections with access point device 104 that can also connect to eNodeB device 108 via access point device 104 that is on the same platform. Thus, communication via access point device 104 can be integrated with the LTE platform at eNodeB device 108 (e.g., in the RAN portion of communication network 116) rather than at the PGW (e.g., in the core network portion of communication network 116).

Figure 4:
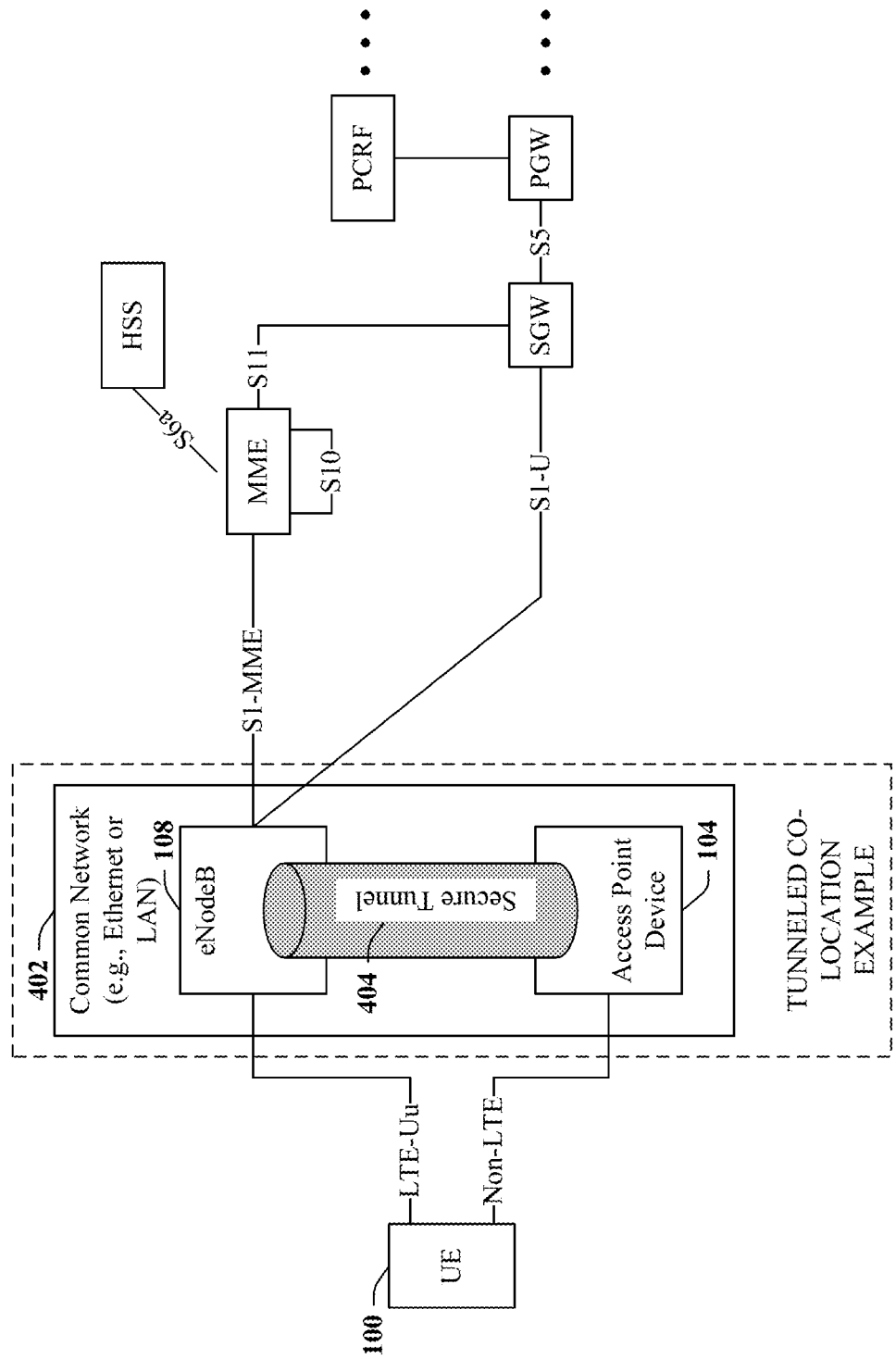
FIG. 4 illustrates a block diagram of an example system according to a tunneled co-location embodiment in accordance with certain embodiments of this disclosure.

With reference now to FIG. 4, system 400 is depicted. System 400 relates to a tunneled co-location embodiment of the disclosed subject matter. The tunneled co-location embodiment can be characterized by eNodeB device 108 and access point device 104 sharing common local area network (LAN) 402 such as an Ethernet. The UE (in this case mobile device 100), can again establish multiple links with eNodeB device 108. Such can include one or more LTE protocol-based paths (e.g., LTE-Uu) as well as one or more non-LTE connections with access point device 104. Secure tunnel(s) 404 can be established between eNodeB device 108 and access point device 104. Secure tunnel(s) 404 can be secure communication path(s) between access point device 104 and eNodeB device 108 and can represent non-LTE access to eNodeB device 108. Hence, in any exemplary scenario, either embedded co-location, tunneled co-location, or another suitable embodiment, communication via access point device 104 can be integrated with the LTE platform at eNodeB device 108 rather than at the packet data network gateway.

Figure 5A:
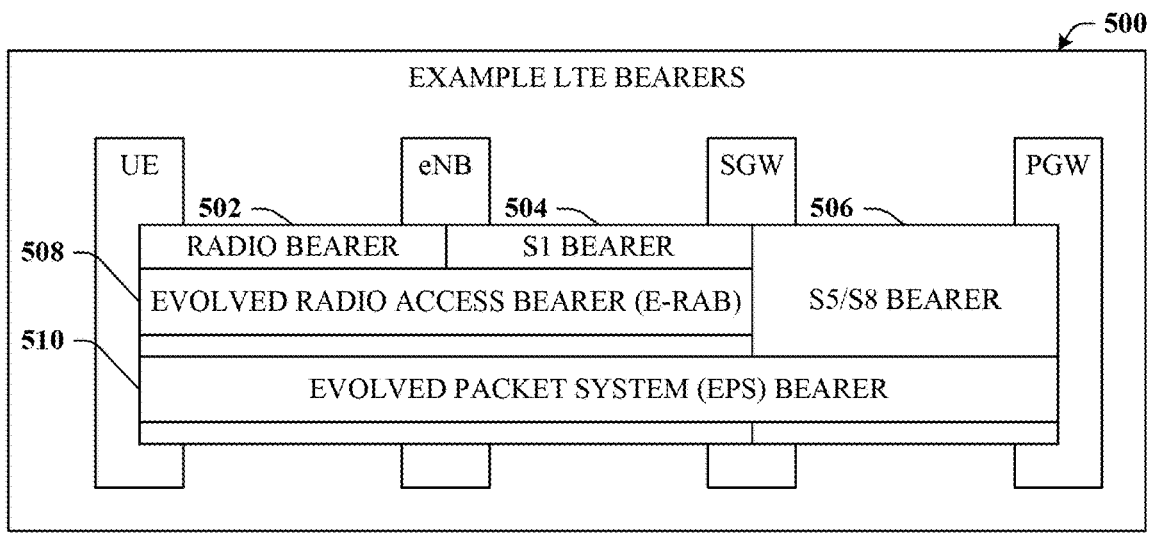
FIG. 5A illustrates an example diagram that illustrates various example LTE bearers in accordance with certain embodiments of this disclosure.
Figure 5B:
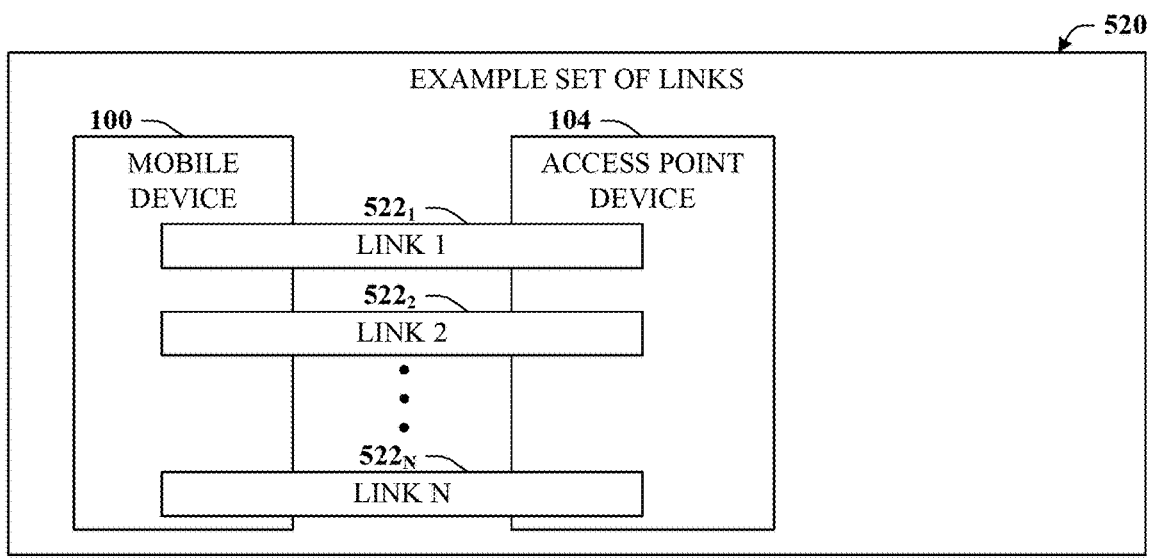
FIG. 5B illustrates an example diagram that illustrates an example set of links between the mobile device and the access point device in accordance with certain embodiments of this disclosure.
Figure 5C:
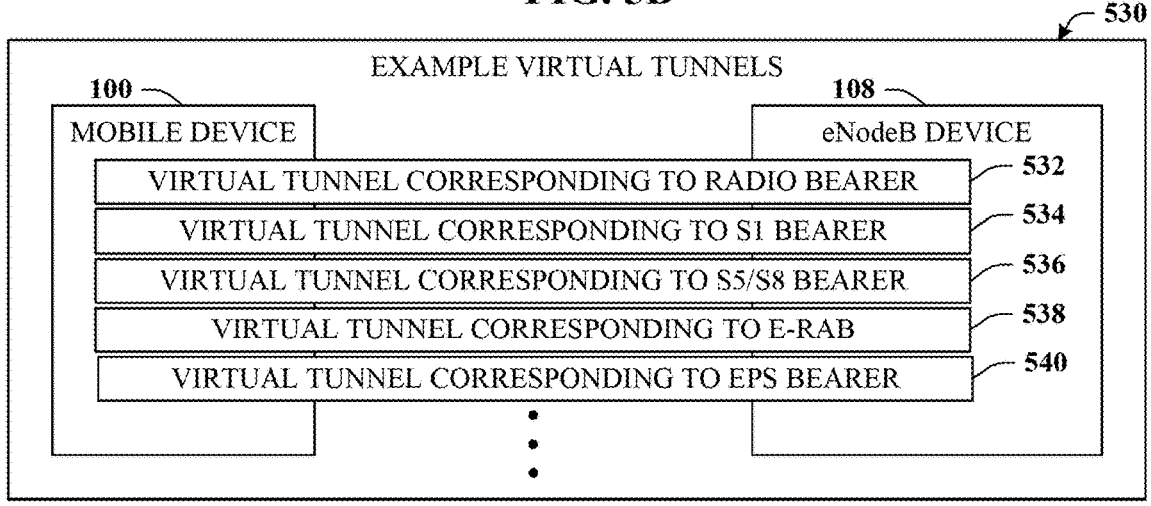
FIG. 5C illustrates an example diagram that illustrates an example set of virtual tunnels between the mobile device and the eNodeB device in accordance with certain embodiments of this disclosure.

Turning now to FIGS. 5A-5C, diagrams 500, 520, and 530 are presented. Diagram 500 illustrates various example LTE bearers. Existing LTE standards provide for various communication paths between various devices of the LTE network, which are referred to as bearers. Generally, bearers are virtual end-to-end "pipes" that are created within the cellular network between different components. For example, radio bearer 502 can accommodate traffic between the UE and the eNodeB. S1 bearer 504 can accommodate traffic between the eNodeB and the serving gateway (SGW) of a core network portion of the LTE network. S5/S8 bearer 506 can accommodate traffic between the SGW and the PGW. Evolved radio access bearer (E-RAB) 508 can accommodate traffic between the UE and the SGW. Evolved packet system (EPS) bearer 510 can accommodate traffic between the UE and the PGW.

Diagram 520 illustrates an example set of links between mobile device 100 and access point device 104. The set of links can include links $522_1$-$522_N$, where N can be virtually any positive integer. Links $522_1$-$522_N$ can be referred to herein, either individually or collectively as link(s) 522. All or a portion of links 522 might pre-exist or might be established based on instructions from one or more controller 150 or 160. It is appreciated that first communication path 102 can be a member of the set of links 522.

Diagram 530 illustrates an example set of virtual tunnels between mobile device 100 and eNodeB device 108. These virtual tunnels 532-540, as well as others not shown, can relate to secure communication paths between mobile device 100 and eNodeB device 108. In some embodiments, virtual tunnels 532-540 can comprise various links 522. In other words, virtual tunnels 532-540 can traverse access point device 104, although in other embodiments, such is not the case.

In some embodiments, virtual tunnels 532-540, as well as others not shown, can correspond to respective bearers 502-510, depicted in illustration 500 of FIG. 5, as well as others not shown. To illustrate, virtual companion tunnel 532 can correspond to radio bearer 502. Virtual tunnel 534 can correspond to S1 bearer 504. Likewise, tunnel 536 can correspond to S5/S8 bearer 506; tunnel 538 can correspond to E-RAB 508; and tunnel 540 can correspond to EPS bearer 510. Additional detail in connection with bearers 502-510, links 522 and virtual tunnels 532-540 is further detailed herein.

For example, while still referring to FIGS. 5A-5C, but turning back to FIG. 1, it can be appreciated that the disclosed subject matter can be implemented systems that also implement other solutions such as those proposed by TS 23.402. For instance, embodiments of the disclosed subject matter can be implemented for deployment scenarios where the non-LTE access point device and the eNodeB device are co-located, with other solutions implemented for other deployment scenarios. Regardless, one of the advantages of embodiments of the disclosed subject matter is that interfaces between the eNodeB and the CN portion of the communication network can remain unaltered. Put another way, compatibility with 3GPP specifications, both in the CN and in the RAN can be maintained. Such compatibility can be accomplished by controllers 150 and/or 160. For example, controllers 150, 160 can interface with the 3GPP means of transporting user plane packets in its CN, namely the bearers detailed in connection with FIG. 5A, which illustrates the bears specified by 3GPP LTE standards.

In some embodiments of the disclosed subject matter, the controllers 150, 160 can interact with the session management procedures of the 3GPP bearers (e.g., bearers 502-510). For example, because of the inclusion and exclusion of additional access links (e.g., links 522) from time to time, the controller 150, 160 can update the bearer state to reflect the use of these non-3GPP links 522 (which can include first communication path 102). For user plane communications between mobile device 100 and eNodeB device 108, essentially packets of the data (e.g., uplink data 120 or downlink data 122) can be extracted from the 3GPP bearers (e.g., bearers 502-510) at one end (e.g., at eNodeB device 108), placed onto non-3GPP links 522, then re-insert them back onto the original associated 3GPP bearers at the other end (e.g., at mobile device 100). Because there may exist multiples of each type of bearer 502-510 an associated multiple number of non-3GPP links 522 can be established and controllers 150, 160 can perform a mapping function for identifying which bearer to insert packets of data 120, 122 upon arrival from a non-3GPP link 522, and which non- 3GPP link 522 to employ to transport packets of data 120, 122 as such packets are extracted from a bearer 502-510.

In some embodiments, mobile device 100 and/or eNodeB device 108 can utilize an associated controller 150, 160 to identify a set of bearers 502-510 and a set of links 522. As described, the set of bearers 502-510 can relate to communication paths fashioned in accordance with LTE protocol 112 between a first device of communication network 116 and a second device of communication network 116. The set of links 522 can relate communication paths, including first communication path 102, fashioned in accordance with non-LTE protocol 106 that differs from LTE protocol 112 between mobile device 100 and access point device 104, and potentially extending to eNodeB device 108 via path(s) 130*b*. Additional detail can be found at FIG. 6, which can now be referenced.

Figure 6:
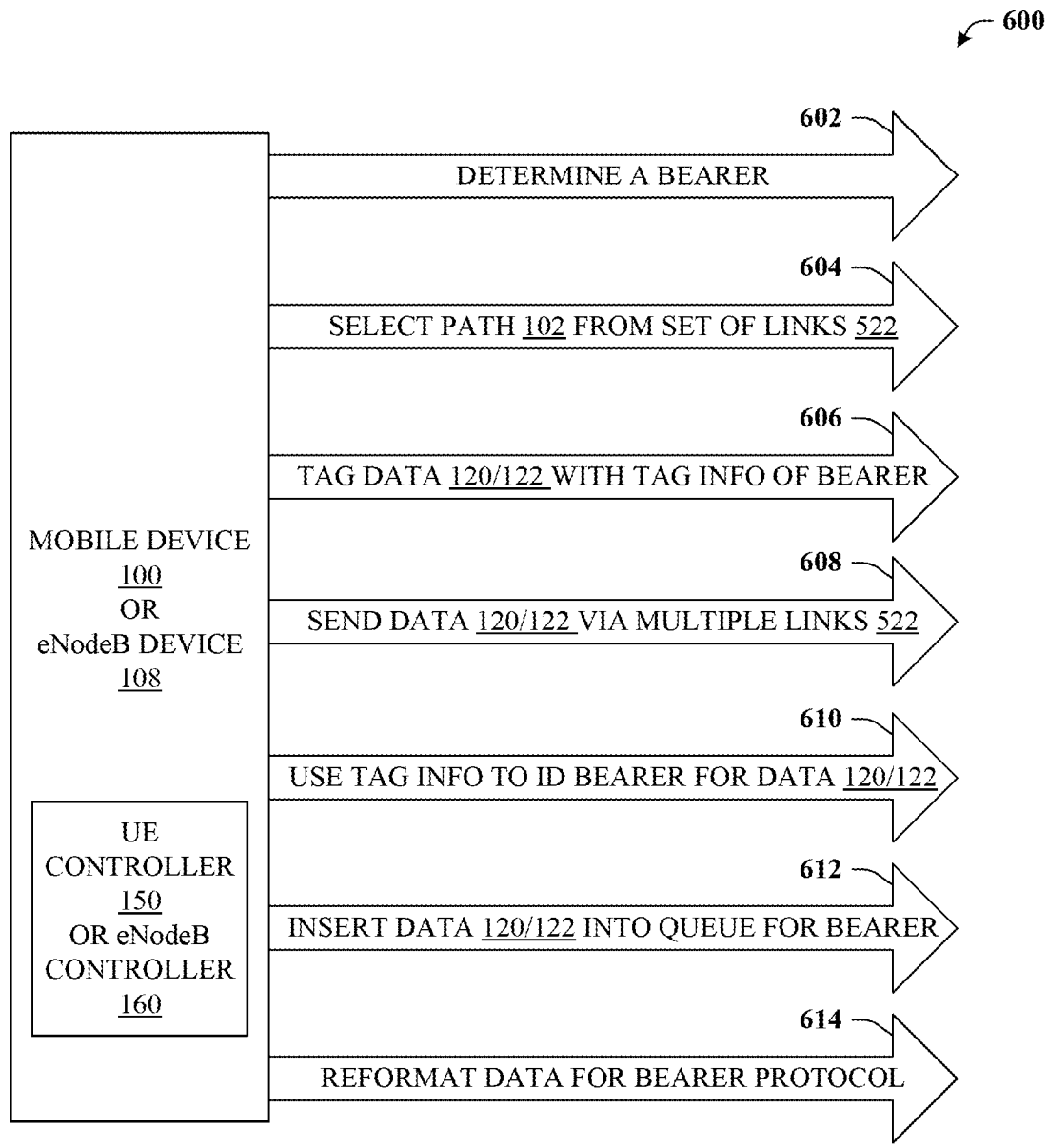
FIG. 6 illustrates a block diagram of an example system that can provide for additional aspects, features, or detail in connection with integrating non-LTE links with an LTE network in accordance with certain embodiments of this disclosure.

FIG. 6 illustrates system 600. System 600 can provide for additional aspects, features, or detail in connection with integrating non-LTE links with an LTE network. In some embodiments, system 600 can relate to mobile device 100 that, along with UE controller 150, can perform operations denoted by reference numerals 602-614. In some embodiments, all or a portion of operations 602-614 can be performed by eNodeB device 108 and associated eNodeB controller 160.

For example, device 100 or device 108 (and/or controller 150, 160) can determine a bearer (e.g., EPS bearer 510) from a set of bearers 502-510 associated with data 120, 122, which is detailed in connection with reference numeral 602. Next, at reference numeral 604, a link 522 from the set of links 522 can be selected for transporting data 120, 122 that other solutions expect to be transported on the EPS bearer 510. The selected link 522 can be denoted as first communication path 102.

As previously noted, controllers 150, 160 can process a mapping function to map bearers to links 522. To facilitate such mapping, in one embodiment, the controller 150, 160 on the egress entity (e.g., device 100 or device 108 with outgoing data 120, 122) of the 3GPP bearer tags packets of outgoing data 120, 122 exiting the 3GPP bearer onto non-3GPP links 522 with additional information so that the controller 150, 160 on the ingress entity (e.g., device 100 or device 108 with incoming data 120, 122) of the 3GPP bearers is able to map the packet of data 120, 122 back to a particular established 3GPP bearer. Tagging data 120, 122 with tag information of a particular bearer is depicted at reference numeral 606.

Hence, as a packet of data 120, 122 arrives over a 3GPP bearer, controller 150, 160 can identify the bearer, and then generates the extra information needed for tagging the data 120, 122 for the purpose of bearer identification. The controller 150, 160 can also identify over which non-3GPP link 522 the packet of data 120, 122 is to be sent based on the conditions of the link 522 at the time and an associated link selection algorithm. This link selection process may also depend on characteristics of the packets themselves, such as which application flows they belong to or what quality-of-service characteristics or security requirements are defined. Data 120, 122 can be sent over the selected link 522 with tagged information. In some embodiments, data 120, 122 with tagged information can be sent from the egress entity via multiple links 522, which is illustrated by reference numeral 608.

At the other end, that is, for the ingress entity (e.g., device 100 or device 108), the controller 150, 160 can identify the 3GPP bearer that a packet belongs to as it arrives over a non-3GPP link 522 by using the tagged information, which is detailed in connection with reference numeral 610. In embodiments where virtual companion tunnels 532-540 are utilized, the 3GPP bearer can be identified based on the non-3GPP virtual tunnel 532-540 by which data 120, 122 arrives at the ingress entity. Regardless of how the bearer is identified, data 120, 122 can be inserted into a queue for the identified bearer by the ingress entity, described at 612. In some embodiments, data 120, 122 can be reformatted according to a bearer protocol of the identified bearer prior to inserting into the identified bearer, as described at 614. It is understood that controllers 150, 160 and/or devices 100, 108 can enforce quality-of-service settings (e.g., max/min bit rates) of the 3GPP bearers when inserting data 120, 122 back to these bearers. Additionally or alternatively, controllers 150, 160 can alter quality-of-service settings of the bearer through the 3GPP standard session management procedures.

Figure 7A:
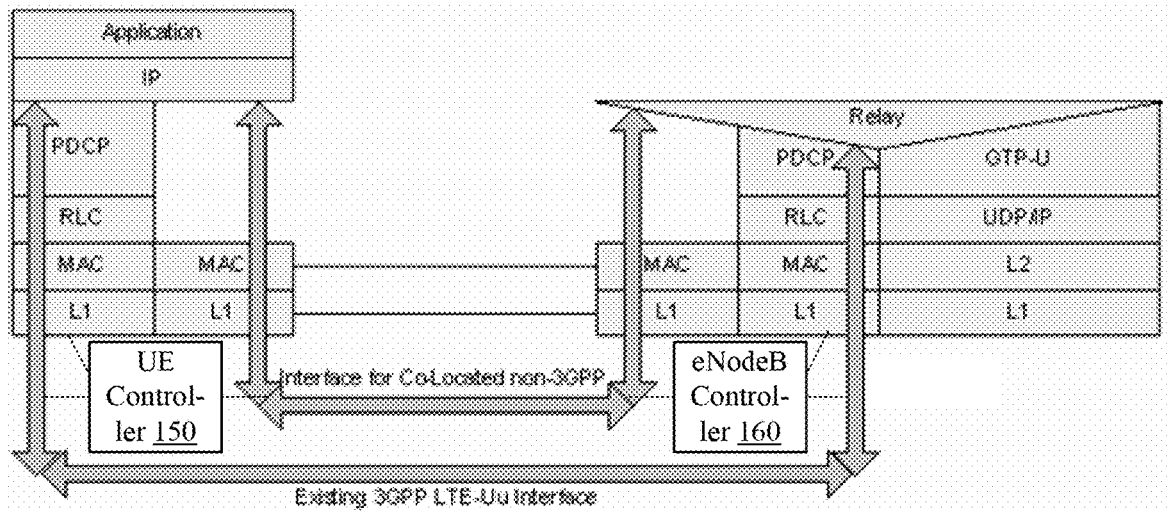
FIG. 7A is an illustration of a protocol stack diagram that provides for an embedded co-location embodiment in which non-3GPP link layer frames carry data in accordance with certain embodiments of this disclosure.
Figure 7B:
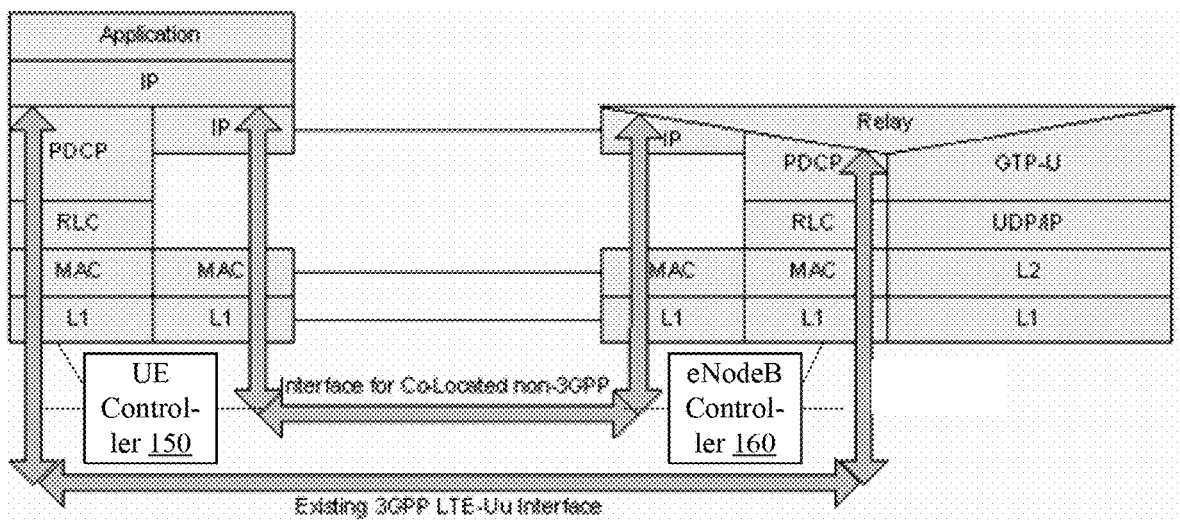
FIG. 7B is an illustration of a protocol stack diagram that provides for an embedded co-location embodiment in which data is encapsulated by another layer of IP header in accordance with certain embodiments of this disclosure.

Referring now to FIGS. 7A and 7B, illustrations 700 and 710 are depicted. Illustration 700 provides for an embedded co-location embodiment in which non-3GPP link layer frames carry data 120, 122. Illustration 710 provides for an embedded co-location embodiment in which data 120, 122 is encapsulated by another layer of IP header, e.g., IP-in-IP encapsulation. FIG. 3 provides an example of embedded co-location embodiments.

For example, for uplink data 120 traffic (e.g., traffic from mobile device 100 to access point device 104 and/or eNodeB 108), UE controller 150 can determine for any given packet of data 120 which path to take, either via the interface for existing 3GPP paths (e.g., second communication paths 118, bearers 502-510, etc.), or the non-3GPP interface for existing or newly created links 522. It is appreciated that, in some embodiments, the former implementation described by illustration 700 can be more efficient, but might require closer interactions with the IP layer implementation of the host, if it is assumed there is no modification of existing IP layers to deal with multiple outgoing interfaces. In some embodiments, the latter implementation described by illustration 710 might incur additional overhead relative to the former implementation, such as in outer layer IP headers. However, the latter implementation can, in some embodiments, be more flexible in terms of implementation because such can depend less on accesses to the internals of the lower layers of the communication protocol stack, and can be more seamlessly integrated with no change to IP layer implementations.

Figure 8A:
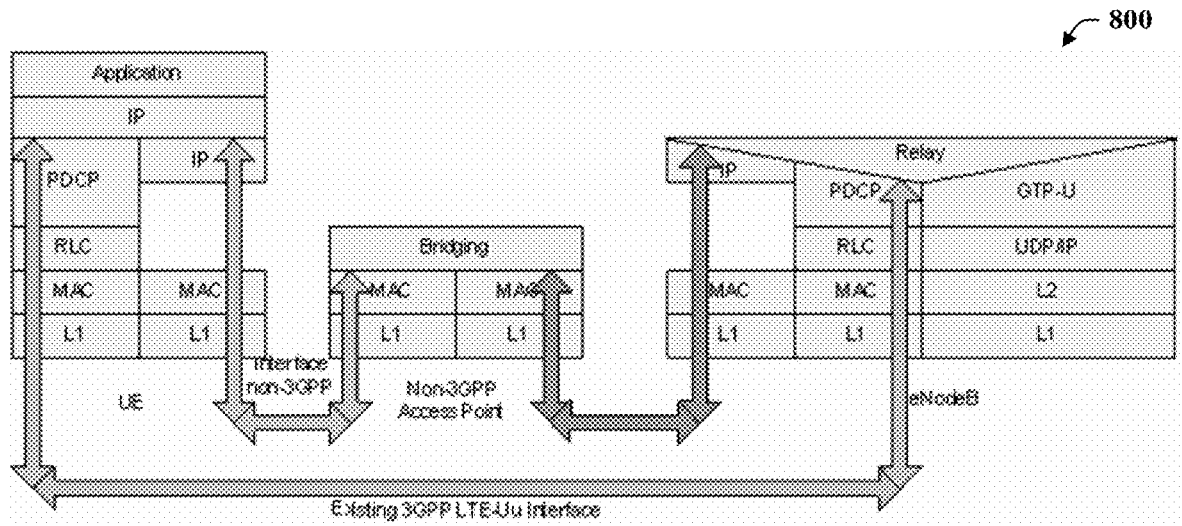
FIG. 8A is an illustration of a protocol stack diagram that provides for a tunneled co-location embodiment in which a non-3GPP bridging access point resides on a same LAN as the eNodeB device in accordance with certain embodiments of this disclosure.
Figure 8B:
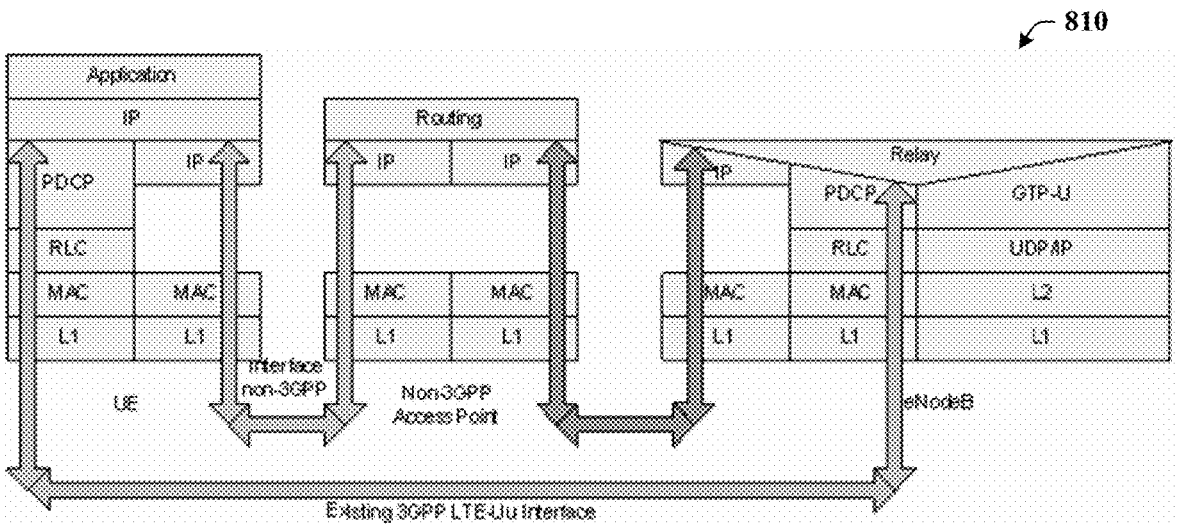
FIG. 8B is an illustration of a protocol stack diagram that provides for tunneled co-location embodiment in which the non-3GPP bridging access point resides on a higher IP layer as part of a routing function in accordance with certain embodiments of this disclosure.

Referring now to FIGS. 8A and 8B, illustrations 800 and 810 are depicted. Illustration 800 provides for a tunneled co-location embodiment in which a non-3GPP bridging access point resides on a same LAN as the eNodeB device 108. Illustration 810 provides for tunneled co-location embodiment in which the non-3GPP bridging access point resides on a higher IP layer as part of a routing function. FIG. 4 provides an example of tunneled co-location embodiments.

For instance, illustrations 800 and 810 depict the protocol stack for different entities for the tunneled co-location cases. In such cases, a separate entity provides the non-3GPP access services to the UE (e.g., mobile device 100). This entity is referred to as the non 3GPP bridging access point. As introduced above, a difference between illustration 800 and 810 relates to the function in the non-3GPP bridging access point that performs the forwarding. In the first case of illustration 800, the non-3GPP bridging access point is on the same LAN as the eNodeB (e.g., eNodeB device 108) and the packet forwarding is performed at the bridging layer. In the second case of illustration 810, such functionality is performed by devices residing above the IP layer as part of the routing function.

Figure 9:
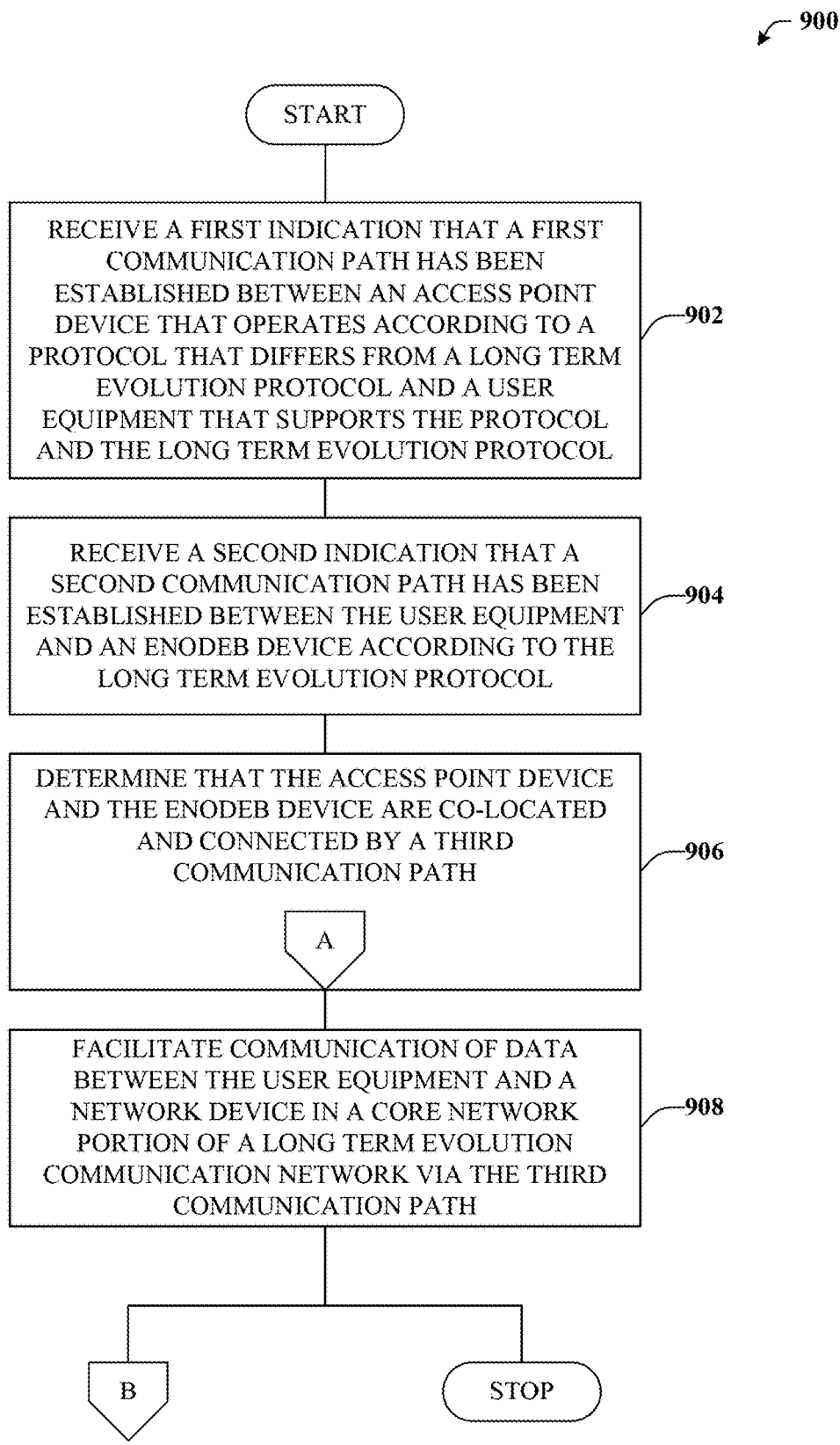
FIG. 9 illustrates an example methodology that can provide for integrating non-LTE links with LTE networks in accordance with certain embodiments of this disclosure.
Figure 10:
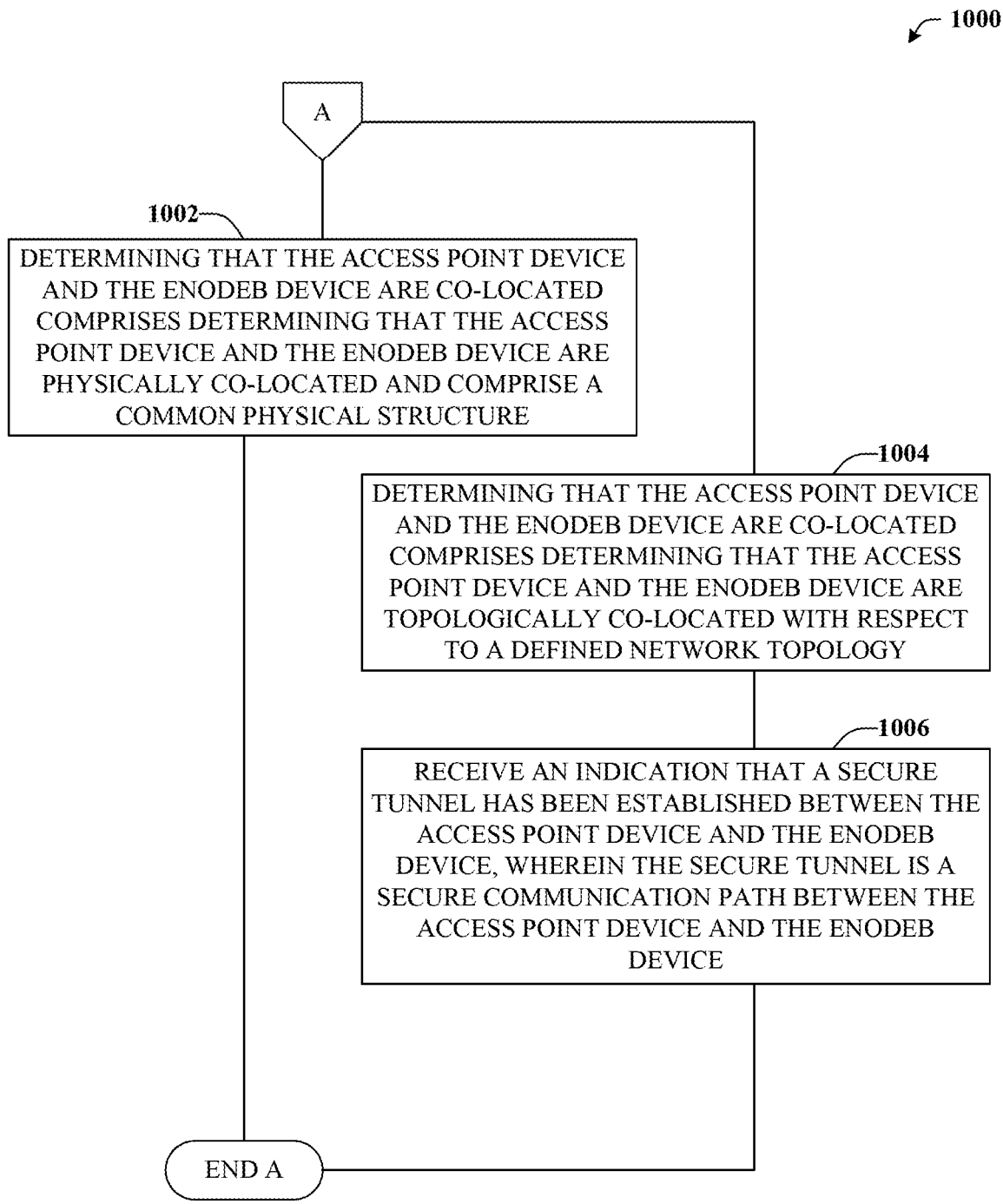
FIG. 10 illustrates an example methodology that can provide for various example techniques associated with determining that the access point device and the eNodeB device are co-located in accordance with certain embodiments of this disclosure.
Figure 11:
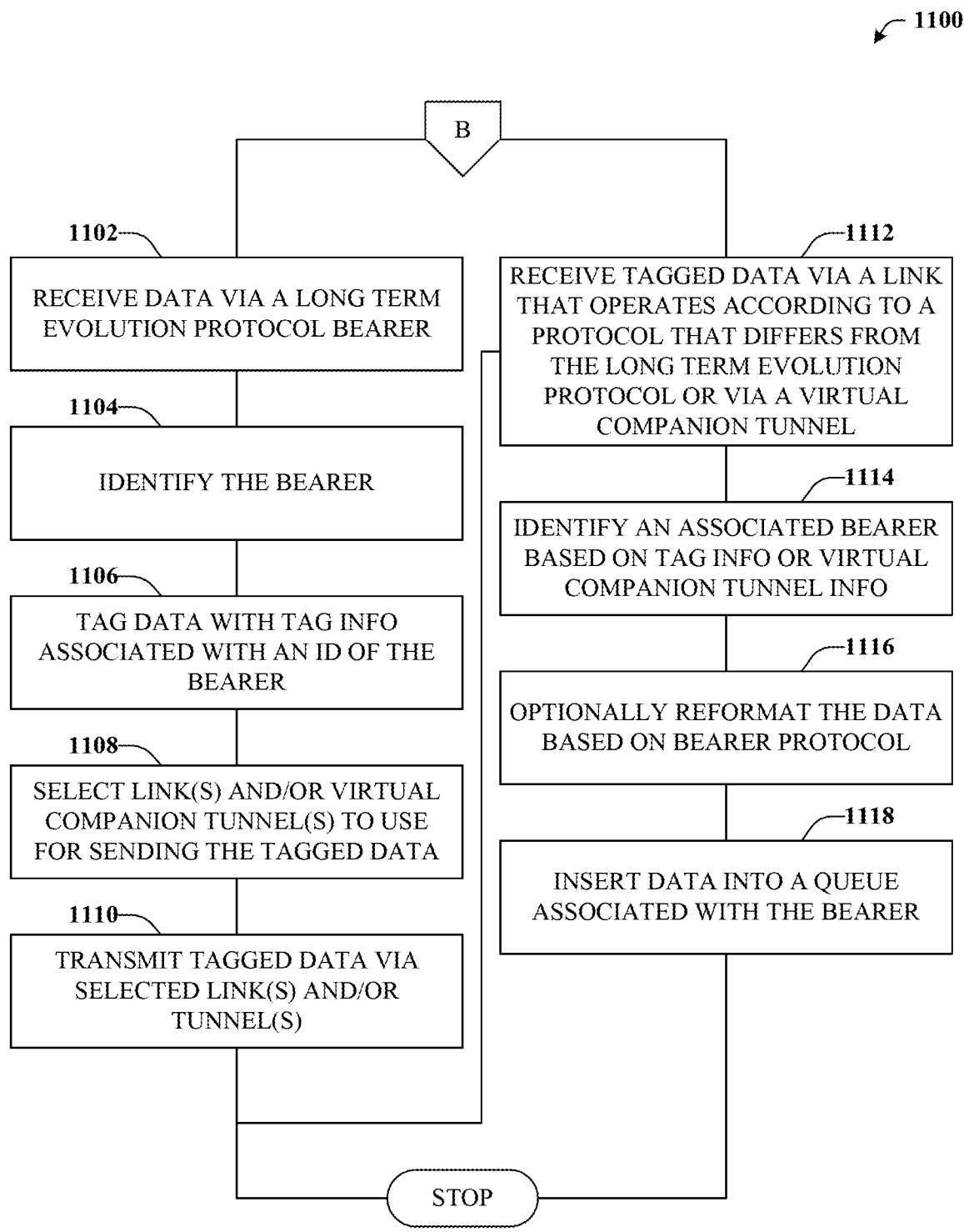
FIG. 11 illustrates an example methodology that can provide for additional features or aspects in connection with integrating non-LTE links with LTE networks in accordance with certain embodiments of this disclosure.

FIGS. 9-11 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 9, exemplary method 900 is depicted. Method 900 can provide for integrating non-LTE links with LTE networks. Generally, at reference numeral 902, a first indication can be received. The first indication can indicate that a first communication path has been established between an access point device that operates according to a protocol that differs from a long term evolution protocol and a user equipment device that supports the protocol and the long term evolution protocol.

At reference numeral 904, a second indication can be received. The second indication can indicate that a second communication path has been established between the user equipment and an eNodeB device according to the long term evolution protocol.

At reference numeral 906, it can be determined that the access point device and the eNodeB device are co-located and connected by a third communication path. Method 900 can proceed via insert A described in FIG. 10, or continue to reference numeral 908. At reference numeral 908, communication of data can be facilitated between the user equipment and a network device in a core network portion of a communication network via the third communication path. The communication network can operate according to the long term evolution protocol.

Turning now to FIG. 10, exemplary method 1000 is illustrated. Method 1000 can provide for various example techniques associated with determining that the access point device and the eNodeB device are co-located. For example, method 1000 can initially proceed to reference numeral 1002. At reference numeral 1002, the determining that the access point device and the eNodeB device are co-located as detailed in connection with reference numeral 906 of FIG. 9 can comprise determining that the access point device and the eNodeB device are physically co-located and comprise a common physical structure (e.g., in the same box or housing or the same tower). Method 1000 can thereafter end and return to reference numeral 906 of FIG. 9.

Additionally or alternatively, method 1000 can initially proceed to reference numeral 1004. At reference numeral 1004, the determining that the access point device and the eNodeB device are co-located as detailed in connection with reference numeral 906 of FIG. 9 can comprise determining that the access point device and the eNodeB device are topologically co-located with respect to a defined network topology (e.g., on the same node or proximal nodes of a common LAN).

At reference numeral 1006, an indication can be received. The indication can indicated that a secure tunnel has been established between the access point device and the eNodeB device. The secure tunnel can be a secure communication path between the access point device and the eNodeB device. Thereafter, method 1000 can end and return to reference numeral 906 of FIG. 9.

Referring now to FIG. 11, exemplary method 1100 is illustrated. Method 1100 can provide for additional features or aspects in connection with integrating non-LTE links with LTE networks. Method 1100 can initially proceed to reference numeral 1102 or 1112, e.g., depending on the communication path by which data is received and/or whether data is received by an ingress device or an egress device and/or whether the data is associated with an LTE protocol or a protocol that differs from LTE.

For example, at reference numeral 1102, data can be received via a long term evolution protocol bearer. In that case, method 1100 can proceed to reference numerals 1104-1110 and thereafter terminate. At reference numeral 1112, data can be received via a link that operates according to a different protocol that differs from the long term evolution protocol or, in some embodiments, via a virtual companion tunnel that operates according to the different protocol. In the second case, method 1100 can proceed to reference numeral 1114-1118, and thereafter end.

At reference numeral 1104, the bearer can be identified. For example, the bearer by which data was received in connection with reference numeral 1102. At reference numeral 1106, the data can be tagged with tag information associated with the bearer and/or an identity of the bearer identified in connection with reference numeral 1104. At reference numeral 1108, an appropriate non-LTE link or non-LTE virtual companion tunnel can be identified and selected for sending the data received at reference numeral 1102 and tagged at reference numeral 1106. At reference numeral 1110, the data can be transmitted via the selected link and/or tunnel.

At reference numeral 1114, the bearer that originally carried the data received at 1102 (e.g., by an egress device), can be identified (e.g., by an ingress device that receives the tagged data transmitted at reference numeral 1110). In particular, the bearer can be identified based on the tag information or based on the virtual companion tunnel by which the tagged data arrives. At reference numeral 1116, the data can be reformatted according to the bearer protocol. In some embodiments, reformatting the data might not be necessary to remain compliant with the bearer protocol. At reference numeral 1118, the data can be inserted into a queue associated with the bearer.

Figure 12:
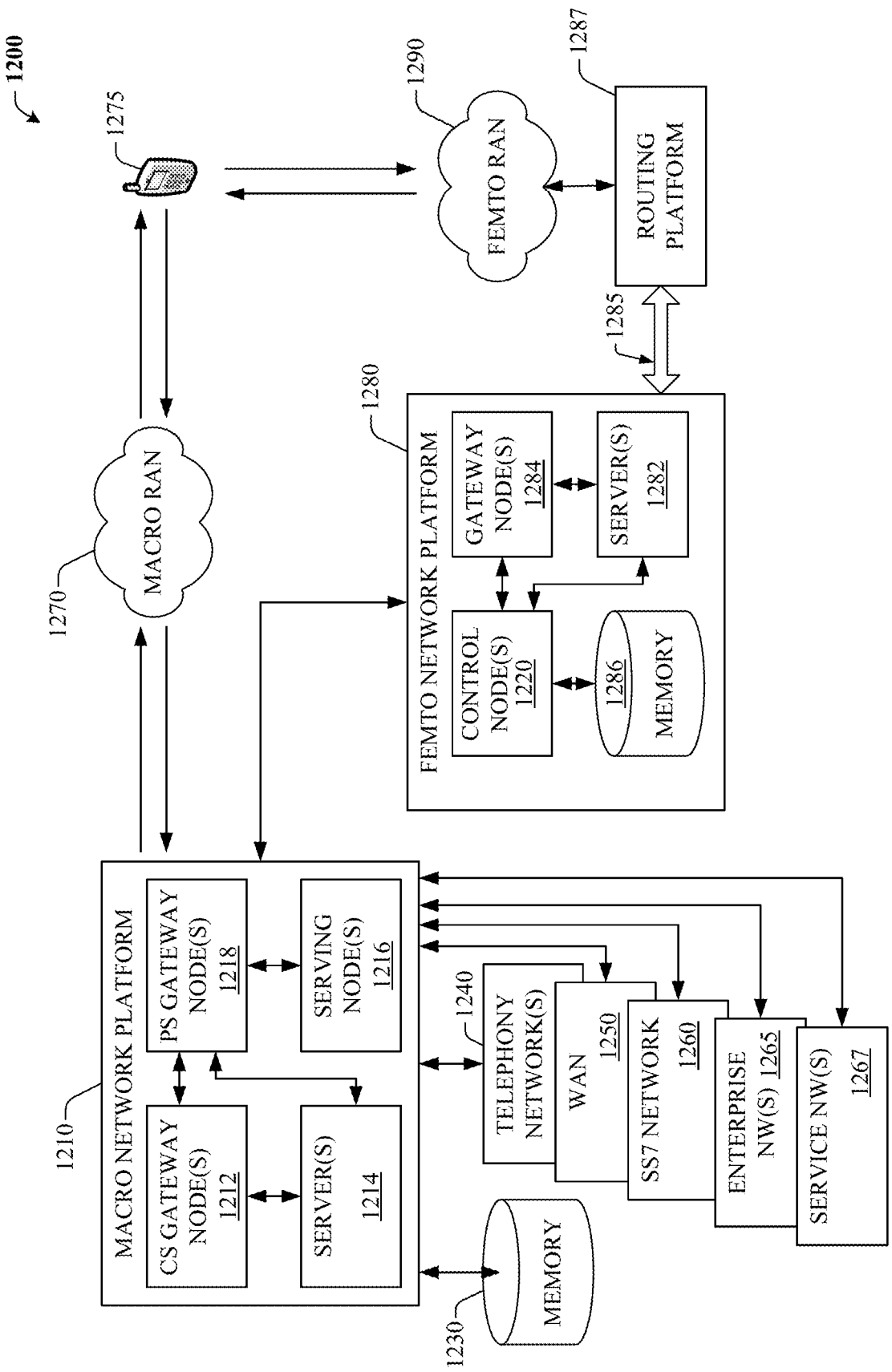
FIG. 12 a first example of a wireless communications environment with associated components that can be operable to execute certain embodiments of this disclosure.

To provide further context for various aspects of the subject specification, FIG. 12 illustrates an example wireless communication environment 1200, with associated components that can enable operation of a femtocell enterprise network in accordance with aspects described herein. Wireless communication environment 1200 includes two wireless network platforms: (i) A macro network platform 1210 that serves, or facilitates communication) with user equipment 1275 via a macro radio access network (RAN) 1270. It should be appreciated that in cellular wireless technologies (e.g., 4G, 3GPP UMTS, HSPA, 3GPP LTE, 3GPP UMB), macro network platform 1210 is embodied in a Core Network. (ii) A femto network platform 1280, which can provide communication with UE 1275 through a femto RAN

1290, linked to the femto network platform 1280 through a routing platform 122 via backhaul pipe(s) 1285. It should be appreciated that femto network platform 1280 typically offloads UE 1275 from macro network, once UE 1275 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1270 can comprise various coverage cells like cell 1205, while femto RAN 1290 can comprise multiple femto access points. As mentioned above, it is to be appreciated that deployment density in femto RAN 1290 is substantially higher than in macro RAN 1270.

Generally, both macro and femto network platforms 1210 and 1280 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1210 includes CS gateway node(s) 1212 which can interface CS traffic received from legacy networks like telephony network(s) 1240 (e.g., public switched telephone network (PSTN), or public land mobile network (PLMN)) or a SS7 network 1260. Circuit switched gateway 1212 can authorize and authenticate traffic (e.g., voice) arising from such networks. Additionally, CS gateway 1212 can access mobility, or roaming, data generated through SS7 network 1260; for instance, mobility data stored in a VLR, which can reside in memory 1230. Moreover, CS gateway node(s) 1212 interfaces CS-based traffic and signaling and gateway node(s) 1218. As an example, in a 3GPP UMTS network, gateway node(s) 1218 can be embodied in gateway GPRS support node(s) (GGSN).

In addition to receiving and processing CS-switched traffic and signaling, gateway node(s) 1218 can authorize and authenticate PS-based data sessions with served (e.g., through macro RAN) wireless devices. Data sessions can include traffic exchange with networks external to the macro network platform 1210, like wide area network(s) (WANs) 1250; it should be appreciated that local area network(s) (LANs) can also be interfaced with macro network platform 1210 through gateway node(s) 1218. Gateway node(s) 1218 generates packet data contexts when a data session is established. To that end, in an aspect, gateway node(s) 1218 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1214. It is to be noted that in 3GPP UMTS network(s), gateway node(s) 1218 (e.g., GGSN) and tunnel interface (e.g., TTG) comprise a packet data gateway (PDG).

Macro network platform 1210 also includes serving node(s) 1216 that convey the various packetized flows of information or data streams, received through gateway node(s) 1218. As an example, in a 3GPP UMTS network, serving node(s) can be embodied in serving GPRS support node(s) (SGSN).

As indicated above, server(s) 1214 in macro network platform 1210 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1210. Data streams can be conveyed to gateway node(s) 1218 for authorization/authentication and initiation of a data session, and to serving node(s) 1216 for communication thereafter. Server(s) 1214 can also effect security (e.g., implement one or more firewalls) of macro network platform 1210 to ensure network's operation and data integrity in addition to authorization and authentication procedures that CS gateway node(s) 1212 and gateway node(s) 1218 can enact. Moreover, server(s) 1214 can provision services from external network(s), e.g., WAN 1250, or Global Positioning System (GPS) network(s) (not shown). It is to be noted that server(s) 1214 can include one or more processor configured to confer at least in part the functionality of macro network platform 1210. To that end, the one or more processor can execute code instructions stored in memory 1230, for example.

In example wireless environment 1200, memory 1230 stores information related to operation of macro network platform 1210. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN(s) 1250, or SS7 network 1260, enterprise NW(s) 1265, or service NW(s) 1267.

Femto gateway node(s) 1284 have substantially the same functionality as PS gateway node(s) 1218. Additionally, femto gateway node(s) 1284 can also include substantially all functionality of serving node(s) 1216. In an aspect, femto gateway node(s) 1284 facilitates handover resolution, e.g., assessment and execution. Further, control node(s) 1220 can receive handover requests and relay them to a handover component (not shown) via gateway node(s) 1284. According to an aspect, control node(s) 1220 can support RNC capabilities.

Server(s) 1282 have substantially the same functionality as described in connection with server(s) 1214. In an aspect, server(s) 1282 can execute multiple application(s) that provide service (e.g., voice and data) to wireless devices served through femto RAN 1290. Server(s) 1282 can also provide security features to femto network platform. In addition, server(s) 1282 can manage (e.g., schedule, queue, format . . . ) substantially all packetized flows (e.g., IP-based, frame relay-based, ATM-based) it generates in addition to data received from macro network platform 1210. It is to be noted that server(s) 1282 can include one or more processor configured to confer at least in part the functionality of macro network platform 1210. To that end, the one or more processor can execute code instructions stored in memory 1286, for example.

Memory 1286 can include information relevant to operation of the various components of femto network platform 1280. For example operational information that can be stored in memory 1286 can comprise, but is not limited to, subscriber information; contracted services; maintenance and service records; femto cell configuration (e.g., devices served through femto RAN 1290; access control lists, or white lists); service policies and specifications; privacy policies; add-on features; and so forth.

It is noted that femto network platform 1280 and macro network platform 1210 can be functionally connected through one or more reference link(s) or reference interface(s). In addition, femto network platform 1280 can be functionally coupled directly (not illustrated) to one or more of external network(s) 1240, 1250, 1260, 1265 or 1267. Reference link(s) or interface(s) can functionally link at least one of gateway node(s) 1284 or server(s) 1286 to the one or more external networks 1240, 1250, 1260, 1265 or 1267.

Figure 13:
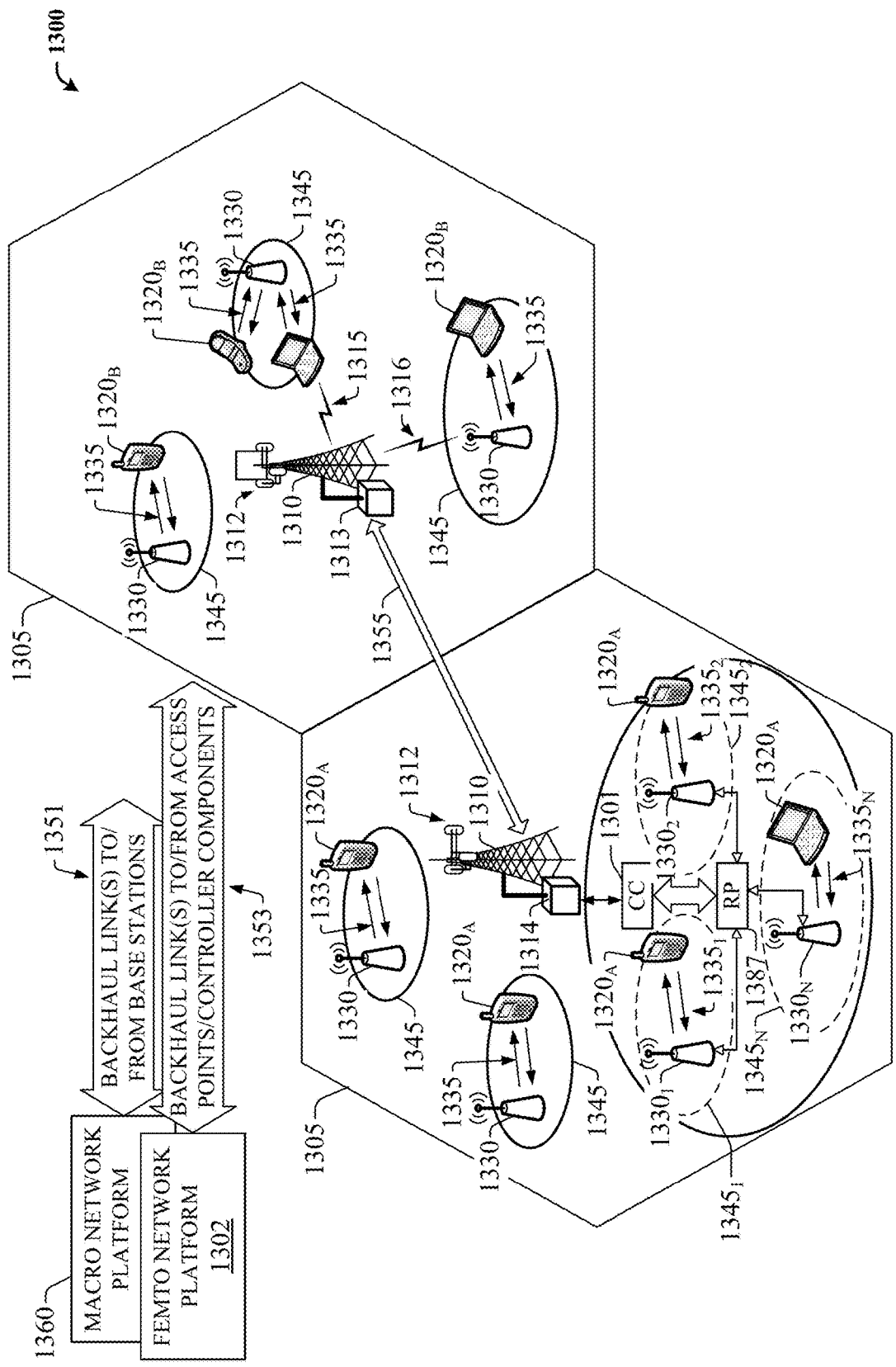
FIG. 13 a second example of a wireless communications environment with associated components that can be operable to execute certain embodiments of this disclosure.

FIG. 13 illustrates a wireless environment that includes macro cells and femtocells for wireless coverage in accordance with aspects described herein. In wireless environment 1305, two areas represent "macro" cell coverage; each macro cell is served by a base station 1310. It can be appreciated that macro cell coverage area 1305 and base station 1310 can include functionality, as more fully described herein, for example, with regard to system 1300. Macro coverage is generally intended to serve mobile wireless devices, like UE $1320_A$, $1320_B$, in outdoors locations. An over-the-air (OTA) wireless link 1335 provides such coverage, the wireless link 1335 comprises a downlink (DL) and an uplink (UL), and utilizes a predetermined band, licensed or unlicensed, of the radio frequency (RF) spectrum. As an example, UE $1320_A$, $1320_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1310 communicates via backhaul link(s) 1351 with a macro network platform 1360, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1360 controls a set of base stations 1310 that serve either respective cells or a number of sectors within such cells. Base station 1310 comprises radio equipment 1314 for operation in one or more radio technologies, and a set of antennas 1312 (e.g., smart antennas, microwave antennas, satellite dish(es) . . . ) that can serve one or more sectors within a macro cell 1305. It is noted that a set of radio network control node(s), which can be a part of macro network platform 1360; a set of base stations (e.g., Node B 1310) that serve a set of macro cells 1305; electronics, circuitry or components associated with the base stations in the set of base stations; a set of respective OTA wireless links (e.g., links 1315 or 1316) operated in accordance to a radio technology through the base stations; and backhaul link(s) 1355 and 1351 form a macro radio access network (RAN). Macro network platform 1360 also communicates with other base stations (not shown) that serve other cells (not shown). Backhaul link(s) 1351 or 1353 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1355 link disparate base stations 1310. According to an aspect, backhaul link 1353 can connect multiple femto access points 1330 and/or controller components (CC) 1301 to the femto network platform 1302. In one example, multiple femto APs can be connected to a routing platform (RP) 1387, which in turn can be connect to a controller component (CC) 1301. Typically, the information from UEs $1320_A$ can be routed by the RP 1387, for example, internally, to another UE $1320_A$ connected to a disparate femto AP connected to the RP 1387, or, externally, to the femto network platform 1302 via the CC 1301, as discussed in detail supra.

In wireless environment 1305, within one or more macro cell(s) 1305, a set of femtocells 1345 served by respective femto access points (APs) 1330 can be deployed. It can be appreciated that, aspects of the subject innovation can be geared to femtocell deployments with substantive femto AP density, e.g., $10^4$-$10^7$ femto APs 1330 per base station 1310. According to an aspect, a set of femto access points $1330_1$-$1330_N$, with N a natural number, can be functionally connected to a routing platform 1387, which can be functionally coupled to a controller component 1301. The controller component 1301 can be operationally linked to the femto network platform 1302 by employing backhaul link(s) 1353. Accordingly, UE $1320_A$ connected to femto APs $1330_1$-$1330_N$ can communicate internally within the femto enterprise via the routing platform (RP) 1387 and/or can also communicate with the femto network platform 1302 via the RP 1387, controller component 1301 and the backhaul link(s) 1353. It can be appreciated that although only one femto enterprise is depicted in FIG. 13, multiple femto enterprise networks can be deployed within a macro cell 1305.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

With respect to FIG. 13, in example embodiment 1300, base station AP 1310 can receive and transmit signal(s) (e.g., traffic and control signals) from and to wireless devices, access terminals, wireless ports and routers, etc., through a set of antennas $1312_1$-$1312_N$. It should be appreciated that while antennas $1312_1$-$1312_N$ are a part of communication platform 1325, which comprises electronic components and associated circuitry that provides for processing and manipulating of received signal(s) (e.g., a packet flow) and signal(s) (e.g., a broadcast control channel) to be transmitted. In an aspect, communication platform 1325 includes a transmitter/receiver (e.g., a transceiver) 1366 that can convert signal(s) from analog format to digital format upon reception, and from digital format to analog format upon transmission. In addition, receiver/transmitter 1366 can divide a single data stream into multiple, parallel data streams, or perform the reciprocal operation. Coupled to transceiver 1366 is a multiplexer/demultiplexer 1367 that facilitates manipulation of signal in time and frequency space. Electronic component 1367 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1367 can scramble and spread information (e.g., codes) according to substantially any code known in the art; e.g., Hadamard-Walsh codes, Baker codes, Kasami codes, polyphase codes, and so on. A modulator/demodulator 1368 is also a part of operational group 1325, and can modulate information according to multiple modulation techniques, such as frequency modulation, amplitude modulation (e.g., M-ary quadrature amplitude modulation (QAM), with M a positive integer), phase-shift keying (PSK), and the like.

Figure 14:
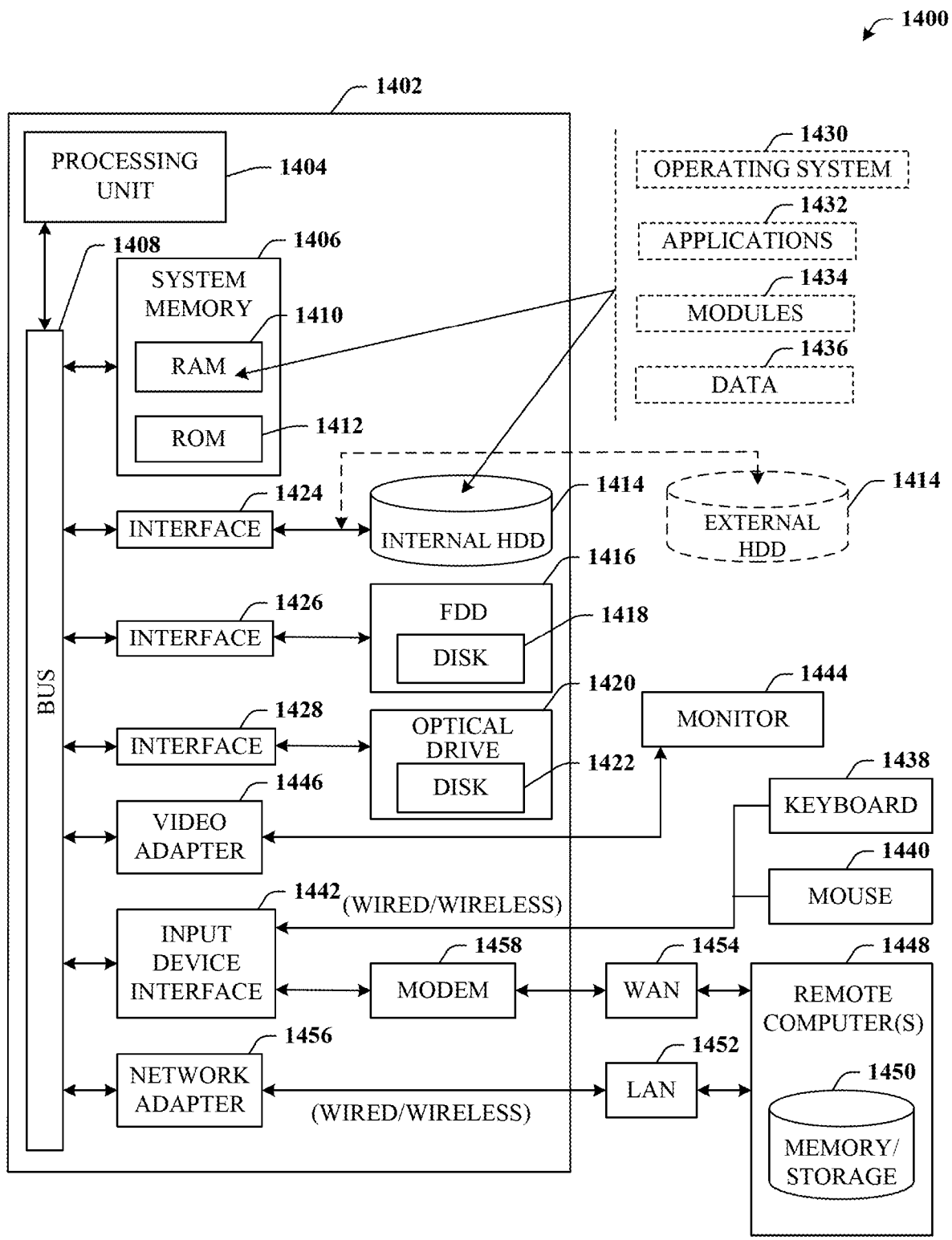
FIG. 14 illustrates an example block diagram of a computer operable to execute certain embodiments of this disclosure.

Referring now to FIG. 14, there is illustrated a block diagram of an exemplary computer system operable to execute the disclosed architecture. In order to provide additional context for various aspects of the disclosed subject matter, FIG. 14 and the following discussion are intended to provide a brief, general description of a suitable computing environment 1400 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Still referring to FIG. 14, the exemplary environment 1400 for implementing various aspects of the disclosed subject matter includes a computer 1402, the computer 1402 including a processing unit 1404, a system memory 1406 and a system bus 1408. The system bus 1408 couples to system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the disclosed subject matter can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, a mobile device, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 14 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. An access point device, comprising:
a processor; and
a memory that stores executable instructions that, when executed by the processor, facilitate performance of operations, comprising:
communicating with a user equipment via a first communication path according to a cellular protocol;
determining that the user equipment is connected to a non-cellular access point device that communicates via a second communication path according to a non-cellular protocol;
in response to a determination that the access point device and the non-cellular access point device are co-located, creating a secure tunnel between the access point device and the non-cellular access point device; and
communicating data via a third communication path that traverses the non-cellular access point device and a virtual tunnel, wherein the virtual tunnel is designated to correspond to a bearer specified by the cellular protocol.

2. The access point device of claim 1, wherein the first communication path comprises bearers, comprising the bearer, representative of first virtual communication paths specified by the cellular protocol, and wherein the second communication path comprises links representative of second virtual communication paths.

3. The access point device of claim 2, wherein the operations further comprise determining translation data representative of a logical mapping between the links, relating to communication via the non-cellular protocol, and the bearers, relating to communication via the cellular protocol.

4. The access point device of claim 3, wherein the translation data comprises first tunnel data representative of a first logical mapping between a first link of the links and a radio bearer of the bearers specified by the cellular protocol to represent a first tunnel between the user equipment and the access point device.

5. The access point device of claim 4, wherein the translation data comprises second tunnel data representative of a second logical mapping between a second link of the links and an evolved radio access bearer of the bearers specified by the cellular protocol to represent a second tunnel between the user equipment and a serving gateway device.

6. The access point device of claim 4, wherein the translation data comprises third tunnel data representative of a third logical mapping between a third link of the links and an evolved packet system bearer of the bearers specified by the cellular protocol to represent a third tunnel between the user equipment and a packet data network gateway device.

7. The access point device of claim 1, wherein the cellular protocol is a protocol specified by third generation partnership project.

8. The access point device of claim 1, wherein the non-cellular protocol is a member of a group comprising: wireless fidelity, worldwide interoperability for microwave access, and high rate packet data.

9. The access point device of claim 1, wherein the data comprises uplink data communicated from the access point device to a network device via the secure tunnel.

10. The access point device of claim 1, wherein the data comprises downlink data communicated from a network device to the access point device via the secure tunnel.

11. The access point device of claim 1, wherein the determination that the access point device and the non-cellular access point device are co-located is a first determination, and wherein the first determination is in response to a second determination that the access point device and the non-cellular access point device are physically co-located.

12. The access point device of claim 1, wherein the determination that the access point device and the non-cellular access point device are co-located is a first determination according to a first criterion, and wherein the first determination is in response to a second determination that the access point device and the non-cellular access point device are topologically co-located with respect to a defined network topology.

13. A device, comprising:
a processor; and
a memory that stores executable instructions that, when executed by the processor, facilitate performance of operations, comprising:
connecting to a first access point device that communicates via a first communication path according to a cellular protocol;
connecting to a second access point device that communicates via a second communication path according to a non-cellular protocol;
in response to a determination that the first access point device and the second access point device are co-located, receiving an indication that a secure tunnel has been established according to the cellular protocol between the first access point device and the second access point device; and communicating data via a third communication path that traverses the second access point device and a virtual tunnel, wherein the virtual tunnel is designated to correspond to a bearer specified by the cellular protocol.

14. The device of claim 13, wherein the first communication path comprises bearers, comprising the bearer, that are representative of first virtual communication paths specified by the cellular protocol, and wherein the second communication path comprises links representative of second virtual communication paths.

15. The device of claim 14, wherein the operations further comprise determining translation data representative of a logical mapping between the links, relating to communication via the non-cellular protocol, and the bearers, relating to communication via the cellular protocol.

16. The device of claim 15, wherein the translation data comprises:
first tunnel data representative of a first logical mapping between a first link of the links and a radio bearer of the bearers specified by the cellular protocol to represent a first tunnel between the device and the first access point device;
second tunnel data representative of a second logical mapping between a second link of the links and an evolved radio access bearer of the bearers specified by the cellular protocol to represent a second tunnel between the device and a serving gateway device; and
third tunnel data representative of a third logical mapping between a third link of the links and an evolved packet system bearer of the bearers specified by the cellular protocol to represent a third tunnel between the device and a packet data network gateway device.

17. A method, comprising:
determining, by a system comprising a processor, that a first access point device communicates with a user equipment via a first communication path according a cellular protocol;
determining, by the system, that a second access point device communicates with the user equipment via a second communication path according to a non-cellular protocol;
determining, by the system, that a secure tunnel has been established between the first access point device and the second access point device; and
communicating, by the system, data via a third communication path that traverses the second access point device and a virtual tunnel, wherein the virtual tunnel is designated to correspond to a bearer specified by the cellular protocol.

18. The method of claim 17, wherein the determining that the secure tunnel has been established is in response to a determination that the first access point device and the second access point device are co-located.

19. The method of claim 18, wherein the determining that the first access point device and the second access point device are co-located in response to a determination that the first access point device and the second access point device are physically co-located and situated in a common physical structure.

20. The method of claim 18, wherein the determining that the first access point device and the second access point device are co-located in response to a determination that the first access point device and the second access point device are topologically co-located with respect to a defined network topology.

* * * * *